(12) United States Patent
Brenner et al.

(10) Patent No.: US 11,936,843 B2
(45) Date of Patent: Mar. 19, 2024

(54) GENERATING TEXTURED THREE-DIMENSIONAL MESHES USING TWO-DIMENSIONAL SCANNER AND PANORAMIC CAMERA

(71) Applicant: FARO Technologies, Inc., Lake Mary, FL (US)

(72) Inventors: Mark Brenner, Asperg (DE); Aleksej Frank, Kornwestheim (DE); Ahmad Ramadneh, Kornwestheim (DE); Mufassar Waheed, Ditzingen (DE); Oliver Zweigle, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 492 days.

(21) Appl. No.: 17/325,956

(22) Filed: May 20, 2021

(65) Prior Publication Data
US 2022/0046221 A1 Feb. 10, 2022

Related U.S. Application Data

(60) Provisional application No. 63/062,669, filed on Aug. 7, 2020.

(51) Int. Cl.
*H04N 13/261* (2018.01)
*G01P 15/097* (2006.01)
(Continued)

(52) U.S. Cl.
CPC ......... *H04N 13/261* (2018.05); *G01P 15/097* (2013.01); *G06T 15/04* (2013.01); *G06T 19/00* (2013.01); *H04N 13/275* (2018.05)

(58) Field of Classification Search
CPC .. H04N 13/261; H04N 13/271; H04N 13/275; H04N 13/254; G01P 15/097; G01P 15/04; G06T 19/00; G06T 17/00
See application file for complete search history.

(56) References Cited

U.S. PATENT DOCUMENTS 10,210,285 B2 2/2019 Wong et al.
10,339,384 B2 7/2019 Lorenzo
(Continued)

OTHER PUBLICATIONS

Censi, "An ICP variant using a point-to-line metric," 2008 IEEE International Conference on Robotics and Automation, May 19-23, 2008, pp. 19-25.
(Continued)

*Primary Examiner* — Edward F Urban
*Assistant Examiner* — Wassim Mahrouka
(74) *Attorney, Agent, or Firm* — McCarter & English, LLP; Dave S. Christensen

(57) ABSTRACT

Techniques are described for converting a 2D map into a 3D mesh. The 2D map of the environment is generated using data captured by a 2D scanner. Further, a set of features is identified from a subset of panoramic images of the environment that are captured by a camera. Further, the panoramic images from the subset are aligned with the 2D map using the features that are extracted. Further, 3D coordinates of the features are determined using 2D coordinates from the 2D map and a third coordinate based on a pose of the camera. The 3D mesh is generated using the 3D coordinates of the features.

20 Claims, 17 Drawing Sheets

(51) Int. Cl.
*G06T 15/04* (2011.01)
*G06T 19/00* (2011.01)
*H04N 13/275* (2018.01)

(56) References Cited

U.S. PATENT DOCUMENTS

2018/0139431 A1* 5/2018 Simek ............... H04N 13/271
2019/0026958 A1* 1/2019 Gausebeck ............ H04N 13/10
2019/0108678 A1* 4/2019 Hazeghi ............... H04N 23/51

OTHER PUBLICATIONS

Lhuillier et al., "Manifold Surface Reconstruction of an Environment from Sparse Structure-from-Motion Data," Computer Vision and Image Understanding, Apr. 5, 2014, pp. 1-42.

* cited by examiner

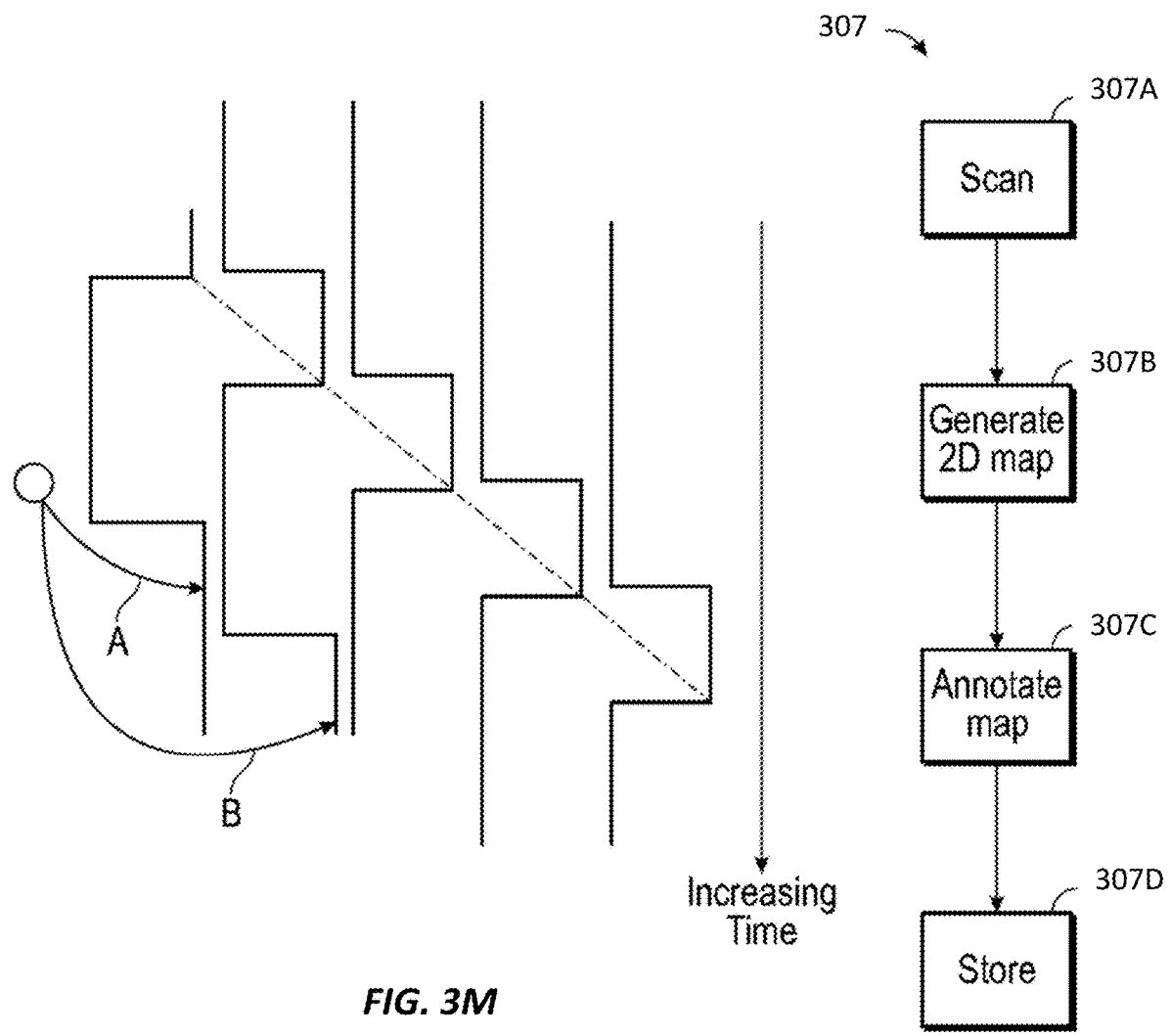

GENERATING TEXTURED THREE-DIMENSIONAL MESHES USING TWO-DIMENSIONAL SCANNER AND PANORAMIC CAMERA

CROSS REFERENCE TO RELATED APPLICATIONS

This application claims the benefit of U.S. Provisional Application Ser. No. 63/062,669, filed Aug. 7, 2020, the entire disclosure of which is incorporated herein by reference.

BACKGROUND

The present application is directed to a system that optically scans an environment, such as a building, and in particular to a portable system that generates two-dimensional (2D) floorplans of the scanned environment and that uses a panoramic camera to provide additional information to generate a three-dimensional scan of the environment.

The automated creation of digital 3D floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene, in the planning of construction or remodeling of a building, and the like.

Existing measurement systems typically use a scanning device that determines coordinates of surfaces in the environment by emitting a light and capturing a reflection to determine a distance, or by triangulation using cameras. These scanning devices are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Accordingly, while existing scanning systems are suitable for their intended purposes, what is needed is a system for having certain features of embodiments of the technical solutions described herein.

BRIEF DESCRIPTION

A system includes a scanner to capture a 2D map of an environment. The system further includes a camera to capture panoramic images of the environment from respective locations in the environment. The system further includes an inertial measurement unit (IMU) to determine a pose of the camera. The system further includes one or more processors operably coupled to the scanner, the IMU, and the camera, the one or more processors being responsive to executable instructions for converting the 2D map into a 3D mesh. A method for converting the 2D map into a 3D mesh includes generating the 2D map of the environment using data captured by the scanner. Further, the method includes identifying a plurality of features from a subset of the panoramic images captured by the camera. Further, the method includes aligning the subset of the panoramic images with the 2D map using the features that are extracted. Further, the method includes determining 3D coordinates of the features using 2D coordinates from the 2D map and a third coordinate based on a pose of the camera. Further, the method includes generating a 3D mesh using the 3D coordinates of the features.

The method further includes applying the subset of the panoramic images as textures on the 3D mesh. Alternatively, or in addition, the method further includes scaling the 3D mesh using the 2D map.

In one example, the camera is coupled with the scanner at a predetermined offset. In one example, the camera and the scanner are coupled with a platform at predetermined positions on the platform.

The features can include at least one from a corner, an edge, and a predetermined shape.

In one example, the scanner is a 2D scanner disposed in a body of a housing, the housing being sized to be carried by a single person during operation, the body having a first plane extending there through.

According to one or more embodiments, a method for generating a three-dimensional (3D) mesh of an environment using a two-dimensional (2D) scanner and a camera includes generating a 2D map of the environment using data captured using the 2D scanner. The method further includes capturing, using the camera, a plurality of panoramic images of the environment from respective locations in the environment. The method further includes identifying a plurality of features from a subset of the panoramic images captured by the camera. The method further includes aligning the subset of the panoramic images with the 2D map using the features that are extracted. The method further includes determining 3D coordinates of the features using 2D coordinates from the 2D map and a third coordinate based on a pose of the camera. The method further includes generating the 3D mesh using the 3D coordinates of the features.

According to one or more embodiments, a computer program product has a memory device with computer executable instructions stored thereon, which when executed by one or more processing units causes the one or more processing units to execute the method for generating a three-dimensional (3D) mesh of an environment.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
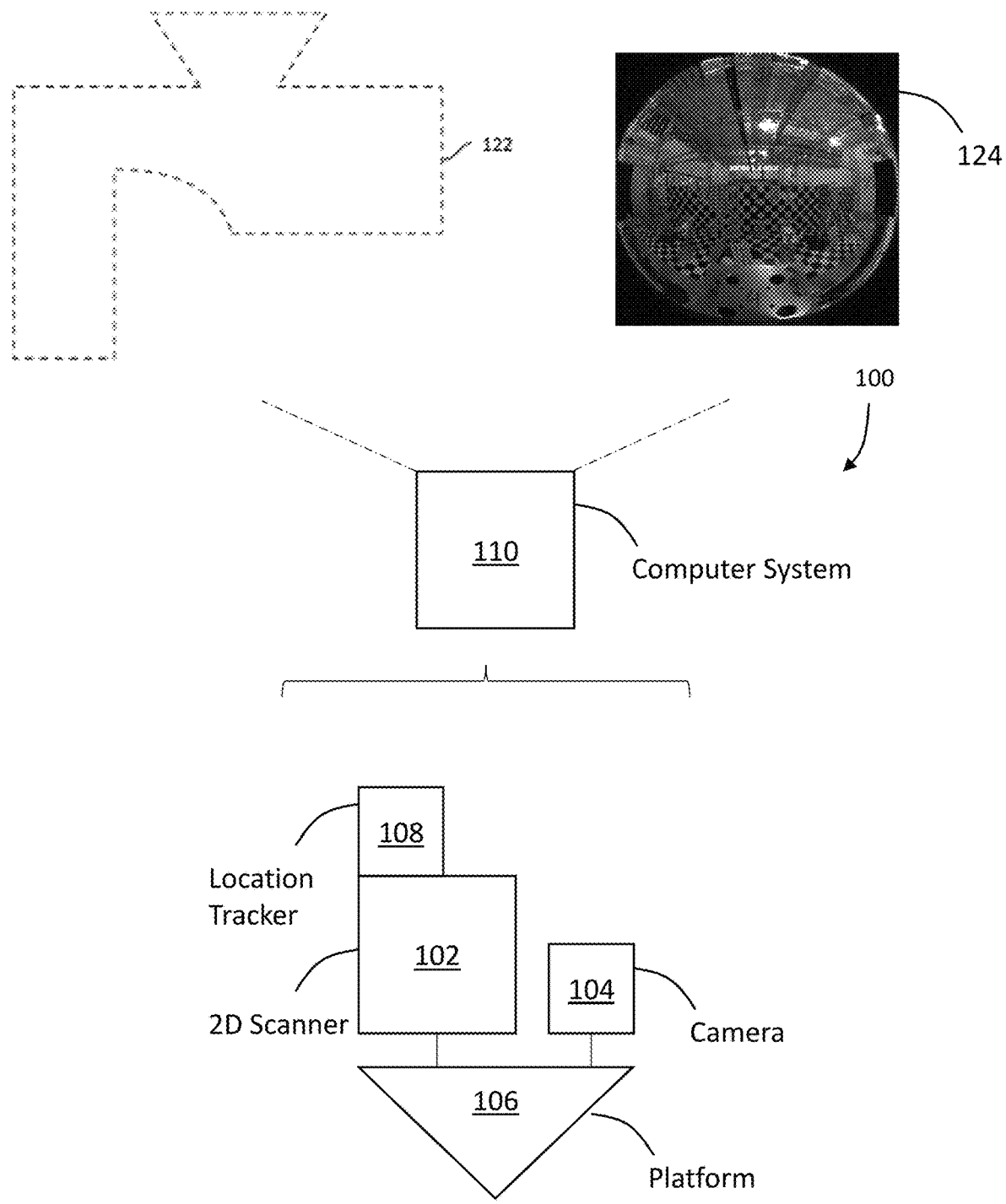
FIG. 1 is an illustration of a system to generate a 3D mesh of an environment in accordance with an embodiment.

The detailed description explains embodiments of the technical solutions described herein, together with advantages and features, by way of example with reference to the drawings.

DETAILED DESCRIPTION

The technical solutions described herein relate to a device that includes a system having a coordinate measurement scanner that works cooperatively with an inertial measurement unit and an image or vision-based sensor to generate a two-dimensional (2D) map of an environment. As used herein, the term "2D map" refers to a representation of the environment measured by a scanner. The 2D map can be represented internally as a grid map that includes a 2D arranged collection of cells, representing an area of the environment. The grid map stores, for every cell, a probability indicating whether the cell area is occupied or not.

Presently, 2D scanners, such as the FARO® SCANPLAN® do not capture three-dimensional (3D) data of the surroundings, rather only 2D maps, which can also be referred to as "floorplans." Particularly, the 2D scanners do not provide height measurements. Hence, a technical challenge exists to capture the 3D data of the surroundings. Presently, specialized 3D scanners are used for such 3D data capture. Such 3D scanners are more complex, more expensive, and bulkier, compared to the 2D scanners like the SCANPLAN®. Accordingly, a technical challenge exists to provide 3D data of the surroundings using a portable scanner system that can capture the data in substantially real time.

Embodiments of technical solutions described herein address such technical challenges and facilitate the 2D scanners to provide 3D data by using panoramic images that are captured using a camera in conjunction with the capture of the 2D maps. It should be noted that a "panoramic image" can be a single image that is captured using an omnidirectional or panoramic camera, such as RICHO® THETA®, or any other such specialized camera that uses a lens with a wide-angle field of view (FOV). Alternatively, or in addition, a "panoramic image" can be a collection of several images captured by a camera, such as a rectilinear camera, at different orientations from the same position, where the multiple images are stitched/combined to create a wider view of the surroundings than each single image from the collection.

The panoramic images can facilitate generating 3D data for the surrounding using photogrammetry, which includes estimating 3D coordinates of points on an object employing measurements made in two or more photographic images taken from different positions. However, a technical challenge with photogrammetry is the lack of scale. Also, photogrammetry workflows are slow, and the results are of low quality, e.g. they are sparse. Here, "slow" workflows can be prohibitive because the user operating the scanner system has to stay steady at a position to capture the 2D data and the panoramic image, which can be difficult particularly with portable scanners.

Embodiments of the technical solutions described herein provide a framework for generating a 3D mesh with scale using 2D scan data from a 2D scanner and an image captured by a panoramic camera. The 2D scan data and the image can be captured substantially in conjunction, in one or more embodiments of the present invention. The "3D mesh" is a polygon mesh which is a collection of vertices, edges, and faces defining surfaces of a polyhedral object in 3D.

FIG. 1 depicts an example system for capturing 3D data of the surroundings according to one or more embodiments. The system 100 includes a 2D scanner 102 and a camera 104. The scanner 102 and the camera 104 are coupled together at a known distance, and orientation from each other. For example, the scanner 102 and the camera 104 can be mounted on a carrying platform 106, such as a trolley, a tripod, etc. It should be noted that in one or more embodiments, the camera 104 can be mounted to the scanner 102 itself, and the system 100 may not have a platform 106.

The scanner 102 captures 2D scan data and generates a 2D map 122 from the scan data. The camera 104 can be a panoramic camera or a rectilinear camera, either of which generate a panoramic image 124 of the surroundings.

In one or more embodiments, the system 100 includes a location tracker 108, such as a geographical position system (GPS), gyroscope, location beacon, inertial measurement unit (IMU), or any other location tracking device. In some embodiments, the location tracker may use simultaneous localization and mapping (SLAM) methodologies to determine the position and orientation of the system 100. The location tracker 108 can monitor a position and orientation of the scanner 102 that can be used to determine a position of the system 100 in the surroundings, in the even the surroundings has not yet been mapped. Alternatively, if the surroundings have been mapped, the location tracker 108 can directly facilitate identifying a location of the system in the surroundings, for example, based on coordinates obtained from the location tracker 108. It should be noted that the location tracker 108 can be internal to the scanner 102, the camera 104, or the platform 106, in one or more embodiments, although the location tracker 108 is shown as a separate block in FIG. 1.

Further, the system 100 includes a computer system 110. In one or more embodiments, the computer system 110 receives data from the 2D scanner 102 and the camera 104. The computer system 110 can also receive data from the location tracker 108 in one or more embodiments. The computer system 110 can also transmit/send data to the 2D scanner 102, the camera 104, and/or the location tracker 108. The data can include instructions. The data transfer can be performed in a wired or a wireless manner. In one or more embodiments, the data transfer can be performed substantially in real time, for example, as the data is captured, it is streamed, or transferred to the computer system 110 by the scanner 102, camera 104, and the location tracker 106, respectively.

In one or more embodiments, the computer system 110 is used to control the movement of the platform 106. For example, the platform 106 includes a controller (not shown) that receives the instructions from the computer system 110 that indicate a path/direction to follow by the platform 106. Further, the computer system 110 can instruct the 2D scanner 102 and/or the camera 104 to start/stop capturing data via the instructions.

In an embodiment, the 2D scanner 102 is the FARO® SCANPLAN®, and the camera 104 is the RICOH® THETA® panoramic camera that is equipped with at least one fish-eye lens. It is understood that other embodiments can use different equipment, without significantly changing the scope of the features described herein.

Figure 2:
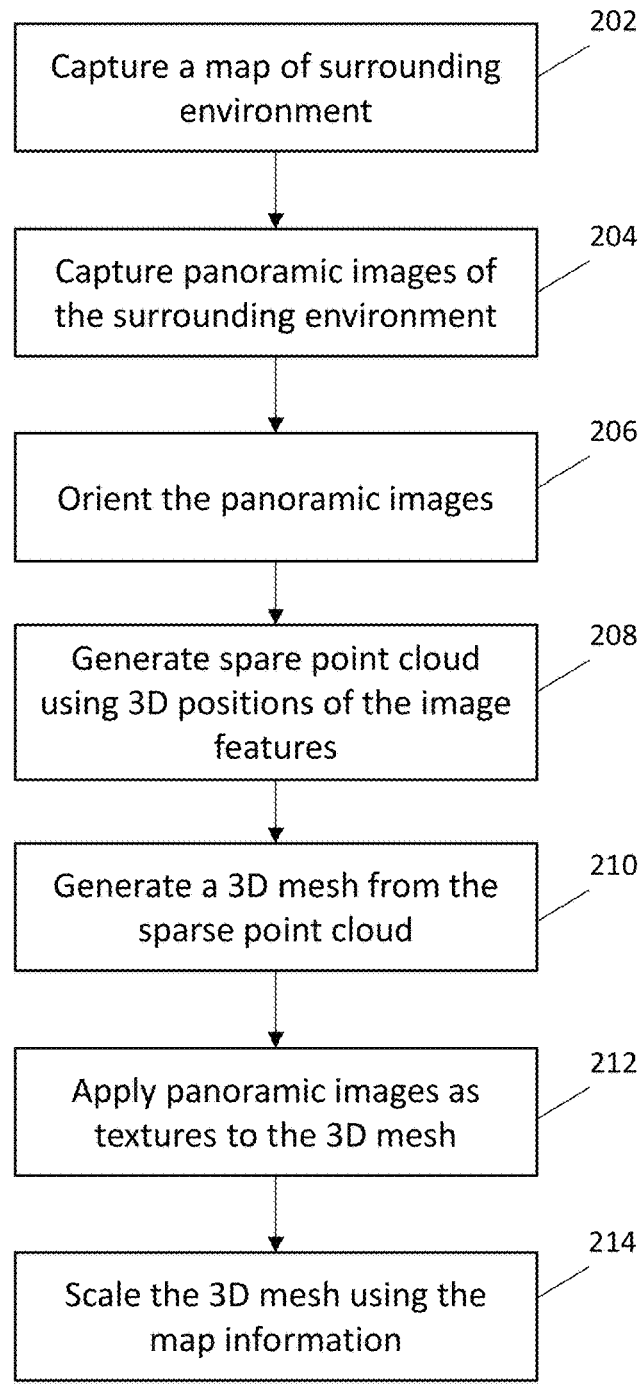
FIG. 2 is a flow diagram of a process for generating a 3D mesh of an environment in accordance with an embodiment.

FIG. 2 depicts a flowchart of a method for generating scaled 3D mesh of the surroundings using a 2D map and a panoramic image according to one or more embodiments. The method 200 can be implemented using the system 100. The method 100 can be performed in real time as the system 100 is capturing data. Alternatively, or in addition, the method 200 can be performed in an offline manner using stored data that has been captured by the system 100.

The method 200 includes capturing a 2D map 122 of the surrounding environment, at block 202. The 2D map 122 captures the geometry/shape of a given environment. The scan data captured by the 2D scanner 102 is input to a 2D map generator (not shown), which generates the 2D map 122 using the scan data of the portion that is scanned. The surroundings can be a space inside of a building. Capturing the 2D map 122 of the portion is performed by the 2D scanner.

In one or more embodiments, the 2D map 122 is generated by capturing multiple portions of the environment from different positions in the environment. The submaps that are created for each of the portions are stitched to create the 2D map 122. The separate portions are stitched by performing operations such as translation, and rotation to align the separate portions. The alignment can be based on one or more landmarks that are captured in the portions. The landmarks can be specific objects in the environment, such as fire extinguishers, furniture, windows, doors, columns, pillars, and other such objects that are typically stationary over at least a predetermined duration, such as weeks, months etc. Alternatively, or in addition, the landmarks can be specific markers that are placed at predetermined positions. The markers can be objects that provide at least a predetermined level of identifiability, such as a particular pattern.

At block 204, the method 200 includes capturing panoramic images 124 of the environment. The panoramic images 124 can be captured by the camera 104 concurrently with scans captured by the 2D scanner 102 in one or more embodiments. In one or more examples, the camera 104 receives an instruction to capture the panoramic image 124 in response to the 2D scanner 102 initiating a scan capture. Alternatively, or in addition, the camera 104 captures the panoramic images 124 at a different frequency than the 2D scanner 102. For example, the camera 104 captures the panoramic images 124 at a frequency that is twice that of the frequency at which the 2D scanner 102 captures 2D scans. The two frequencies can have any relation other than twice, which is just one example. A collection of panoramic images 124 is captured from different positions of the system 100. The capturing can be performed automatically at predetermined frequency, concurrently with the scanning, and/or in response to manual instructions. Every panoramic image 124 that is captured includes, or is stored in association with, location information of the camera 104. The location information is acquired from the location tracker 108.

At block 206, the panoramic images 124 that are captured from different positions are oriented and positioned. For example, the orientation can be performed using structure from motion approaches or other photogrammetric methods. In an example feature detection is performed on the images 124 to extract features using algorithms like scale-invariant feature transform (SIFT), speeded up robust features (SURF), gradient location and orientation histogram (GLOH), histogram of oriented gradients (HOG), or any other such algorithms.

The extracted features can include edges, such as edges where walls meet floors, walls meet ceilings, a wall meets another wall, edges of objects in the environment, etc. The extracted features can also include specific shapes, for example, doors, windows, columns, beams, photo-frames, or other such items that can be observed in the environment. The extracted features can further include corner points (edges with gradients in multiple directions). The extracted features are characteristics of the images that can be identifiable, and are not limited to those described above, and can vary form one embodiment to another.

The extracted features from a first image 124 from the set of captured images are matched in various other images 124 from the same set of images to form observations captured from multiple perspectives (positions). Using these observations in multiple images 124 from those captured, the captured images 124 are aligned by orienting the images 124. The orientation and position of the images 124 to each other can be found using algorithms such as bundle adjustment. Any of the known algorithms for performing bundle adjustment can be used, such as Levenberg-Marquardt. Another matching algorithm to track features from one image to another is the Lukas-Kanade tracker.

It should be noted that in one or more embodiments, a calibration of the camera 104 is performed beforehand so that undistorted images are received from the camera 104 for performing embodiments of the technical solutions described herein. Alternatively, or in addition, the images received from the camera 104 are optimized and/or adjusted during bundle adjustment operation.

In one or more embodiments, the matched features are filtered using techniques such as random sample consensus (RANSAC) or any other known technique. Such filtering algorithms typically remove the outlier correspondences in the matched features.

The orientation can include aligning the panoramic images with the 2D map 122. For example, an edge, a corner, a door, a window, or any other such feature from the 2D map 122 is aligned with corresponding feature from the panoramic image(s) 124.

Further, 3D positions of the features are determined. The 3D positions of the features can be determined based on the features being visible in multiple images that are captured from different positions, respectively. The feature trajectories over time are then used to reconstruct their 3D positions and the camera's motion. The 3D positions of the features are determined based on the correspondence between the images combined with location information from the location tracker 108. Various algorithms exist to determine such surface from motion (SFM). This approach orients and positions the panoramic images 124 at least with a predetermined precision.

Accordingly, 3D coordinates (i.e., position) of a point of the feature, e.g., a corner, can be determined based on 2D coordinates, for example, X and Y coordinates, are determined from the 2D map. The 2D coordinates can be determined based on the alignment of the panoramic image 124 that contains the feature with the 2D map, and the location of the camera 104 (or scanner 102) recorded at the time of capturing the panoramic image 124 (or the 2D map 122). Further, the third coordinate, for example, the Z coordinate (height) can be determined based on the height of the camera 104. In one or more embodiments, the height of the camera 104, in relation to the ground level on which the platform 106 is being transported, is known or calibrated prior to capturing the data. The camera 104 is coupled to the platform 106 at a known location. Accordingly, the height of the lens of the camera 104 is known. Using this known height value, the location at which the panoramic image 124 was captured, and the 2D coordinate of the feature, the height of the feature can be estimated using trigonometry.

At block 208, the 3D coordinates of the image features can be used to generate a sparse point cloud of the environment. The 3D positions of the image features provide the sparse point cloud.

However, as noted earlier, a technical challenge with this point cloud data is that is lacks scale. Consequently, the 3D point clouds are generated in a relative "image-space" coordinate system, which has to be aligned to a real-world, "object-space" coordinate system of the environment. Typically, capturing additional panoramic images 124 and corresponding camera positions can overcome such a technical challenge, however, the number of panoramic images 124 required can make the time, computational resources, and cost prohibitive. Accordingly, the technical challenge still exists and is addressed by embodiments of the technical solutions described herein.

Technical solutions described herein address the technical challenge by creating a 3D mesh from the sparse 3D point cloud and fitting the 3D mesh onto the 2D map and scaling the 3D mesh with the 2D map information. Alternatively, or in addition, the known fixed height of the camera 104 from the floor is used to map the 3D mesh with the 2D map 122. Alternatively, or in addition, the 2D map is mapped with the 3D data by using a transformation from the scanner 102 to the camera 104 acquired by a calibration, particularly in the case where the scanner 102 and the camera 104 are fixed to each other.

Accordingly, at block 210, a 3D mesh is created corresponding to the sparse 3D point cloud. Algorithms, such as Delaunay triangulation, are used to generate the 3D mesh. To improve the result of the meshing, in one or more embodiments, geometric constraints are introduced to produce a closed mesh from the point cloud data. An example of such constraints can be a 2-manifold, where the generated list of triangles in the 2D mesh is such that every triangle is exactly connected by its three edges to three other triangles. The manifold property enforces smoothness constraints on the computed surface of the 3D mesh. In this case, the manifold property is used to constrain a surface interpolating the sparse point cloud and to improve surface denoising.

It should be noted that using the sparse point clouds for generating the 3D mesh provides a savings in both, time and space complexities, compared to a dense point cloud being used. This is particularly an improvement over existing techniques that map large and complex environments, such as office buildings, malls, industrial areas, etc. Further, the sparse data facilitates a substantially real-time visualization of the resulting 3D depiction of the environment.

The method 200 further includes texturing the 3D mesh using the panoramic images 124, at block 212. The texturing can include aligning the panoramic images 124 with the 3D mesh. The alignment can be performed based on the coordinates of the image features extracted.

Further, at block 214, the 3D mesh is scaled using information from the 2D scanner 102. For example, a plane e.g. a wall which is visible in the 2D map 122 and the mesh (described further), is used. From the 2D map 122 the distance to the plane can be determined, and the pose of the camera 104 relative to the scanner 102 can be determined. With this information a scaling is applied to the data set to determine the 3D coordinates of points on the plane.

Figure 3A:
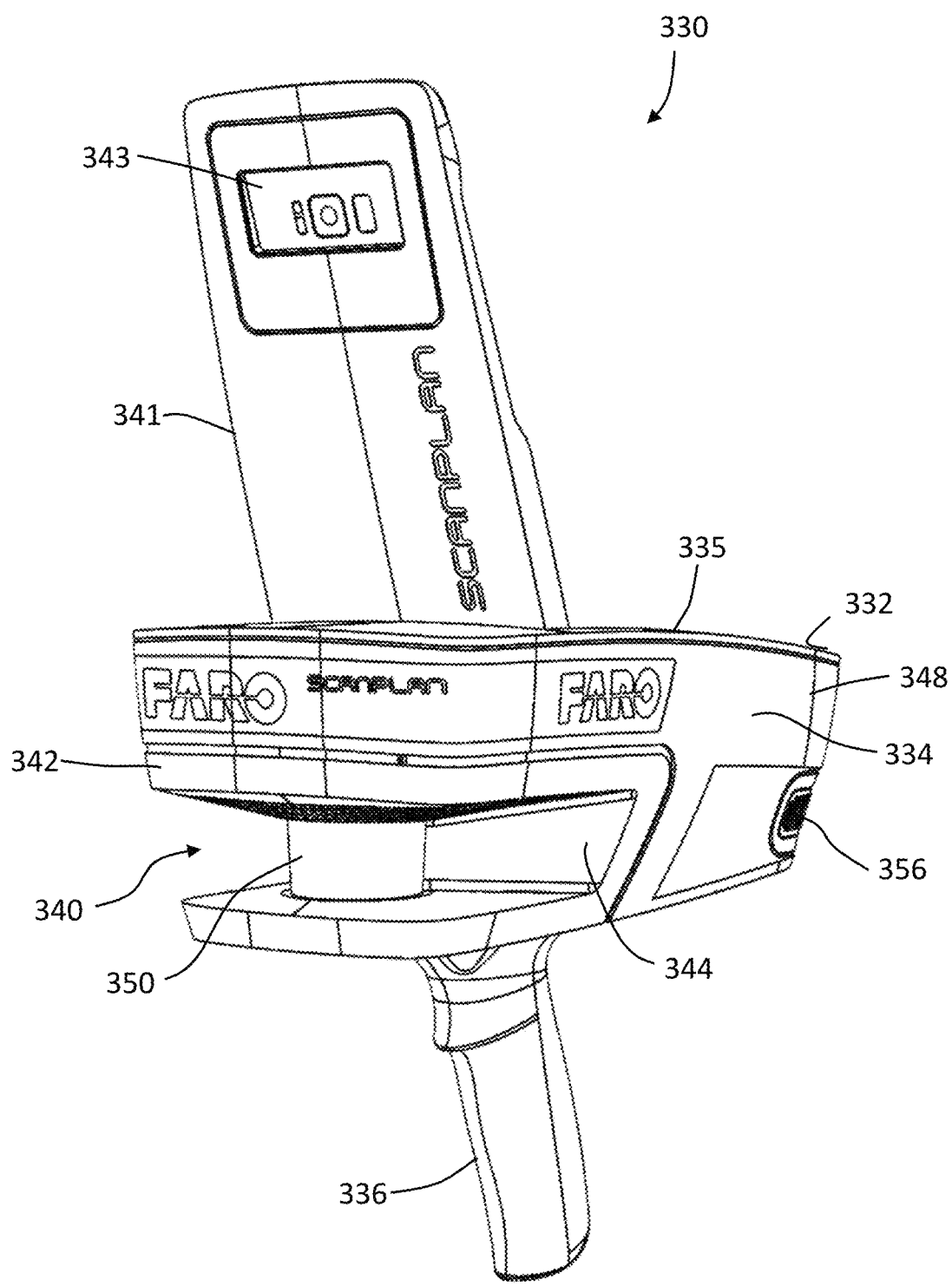
FIGS. 3A-3R depict an embodiment of structure and usage of a 2D scanner in accordance with technical solutions described herein.
Figure 3B:
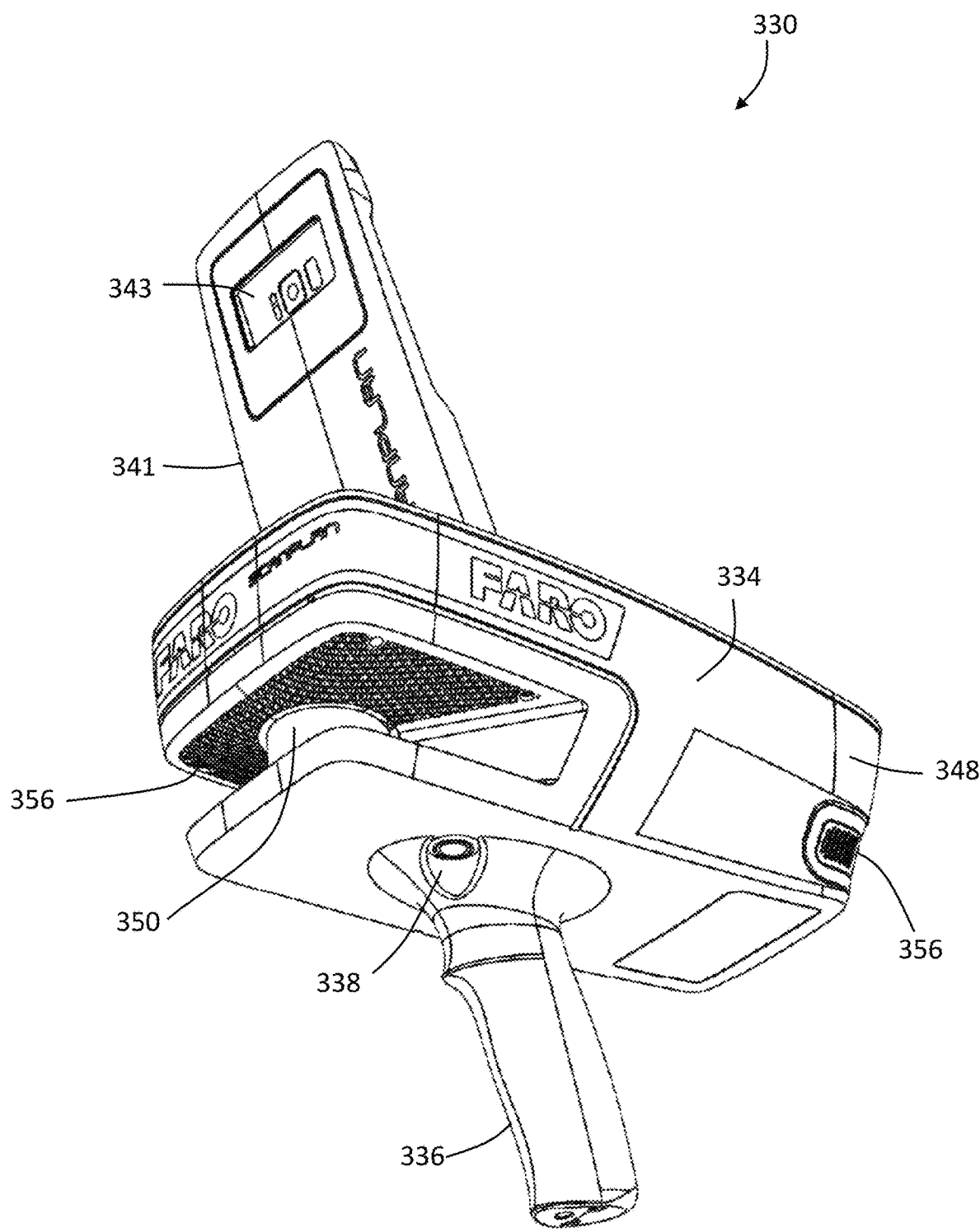
Figure 3C:
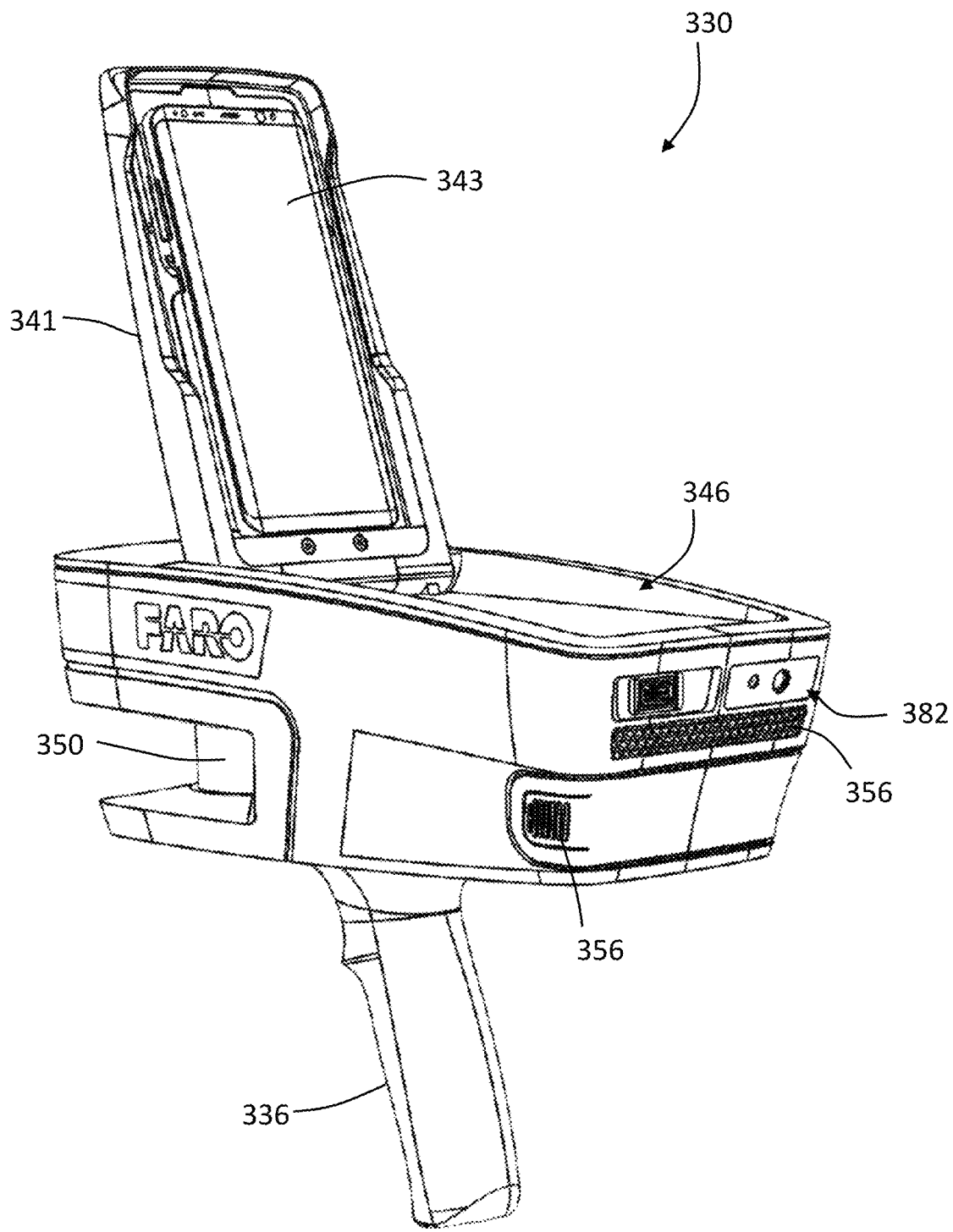
Figure 3D:
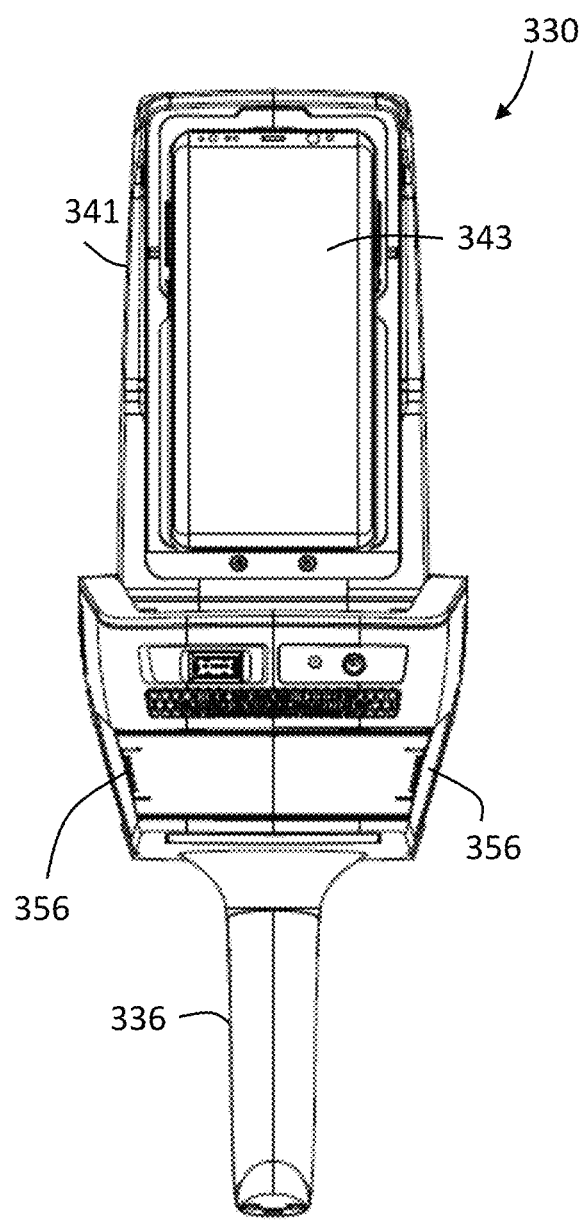
Figure 3E:
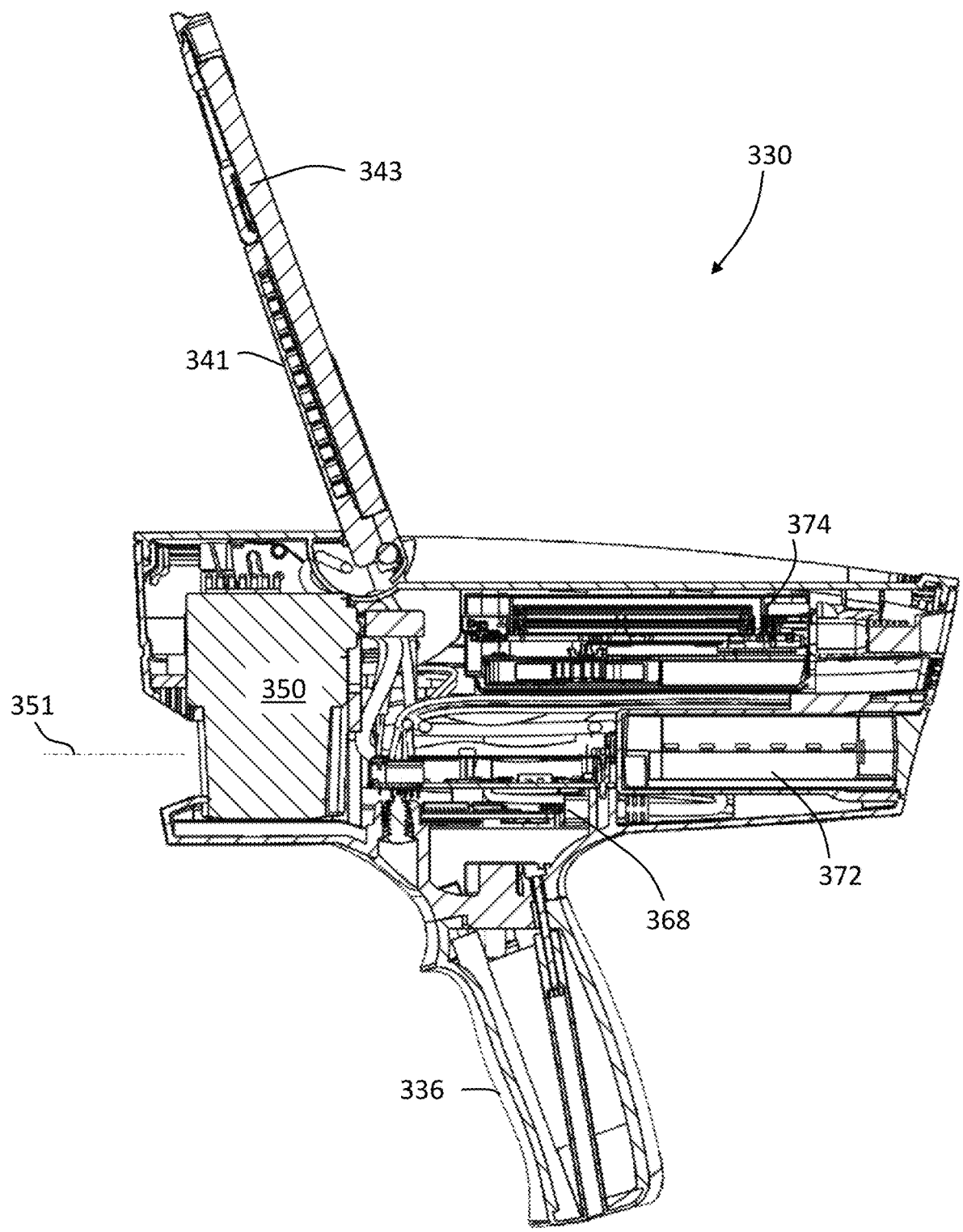
Figure 3F:
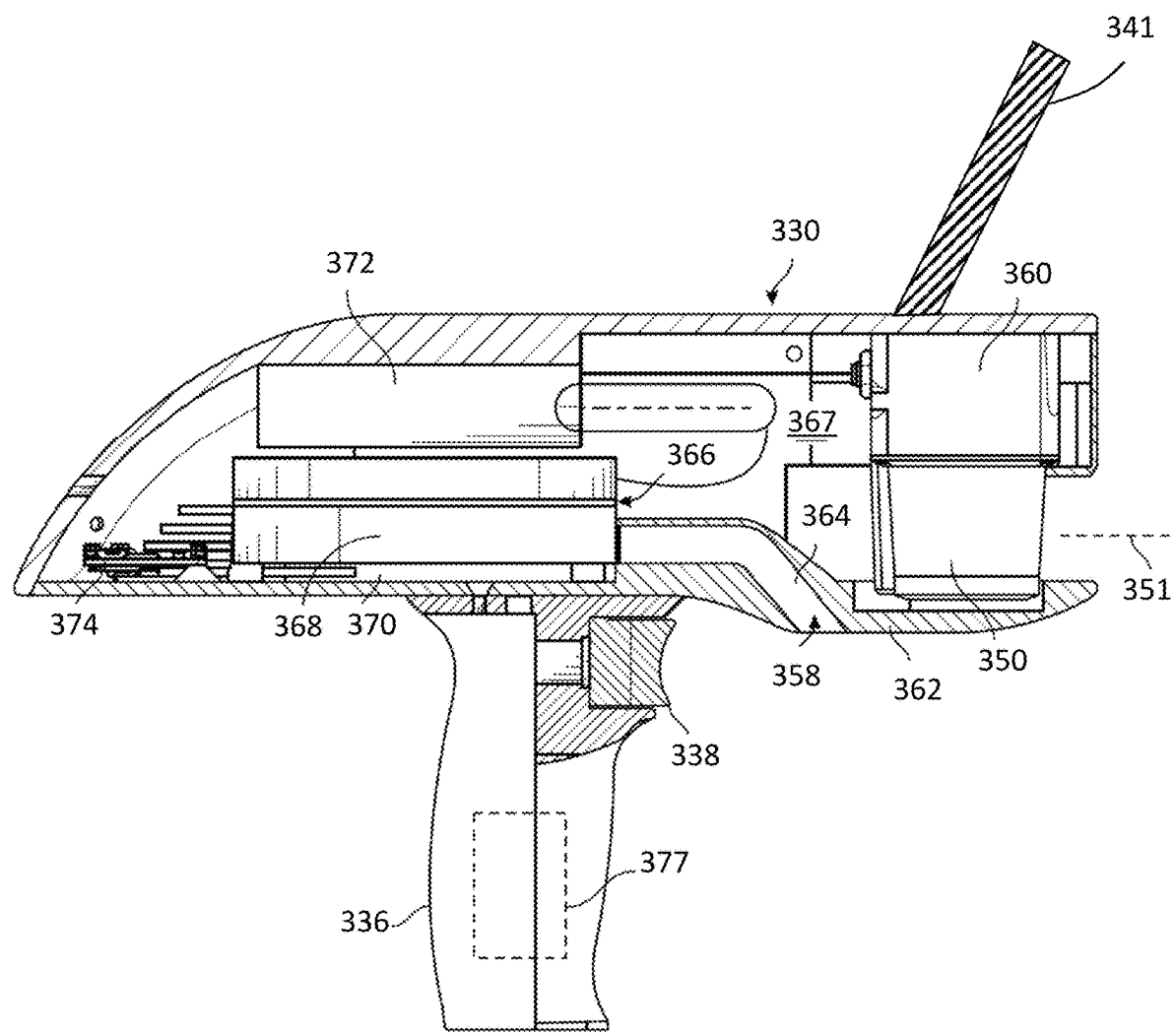
Figure 3G:
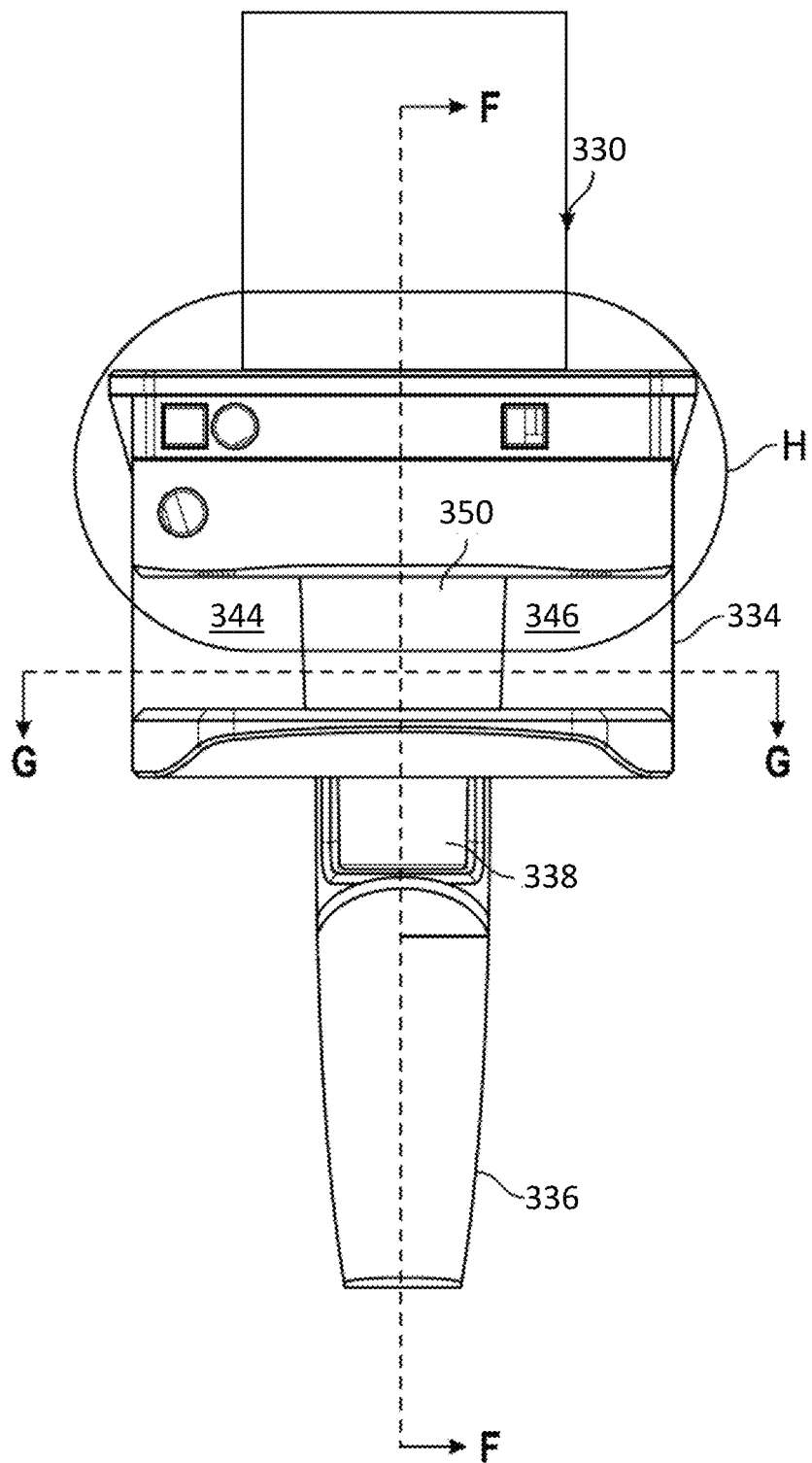
Figure 3H:
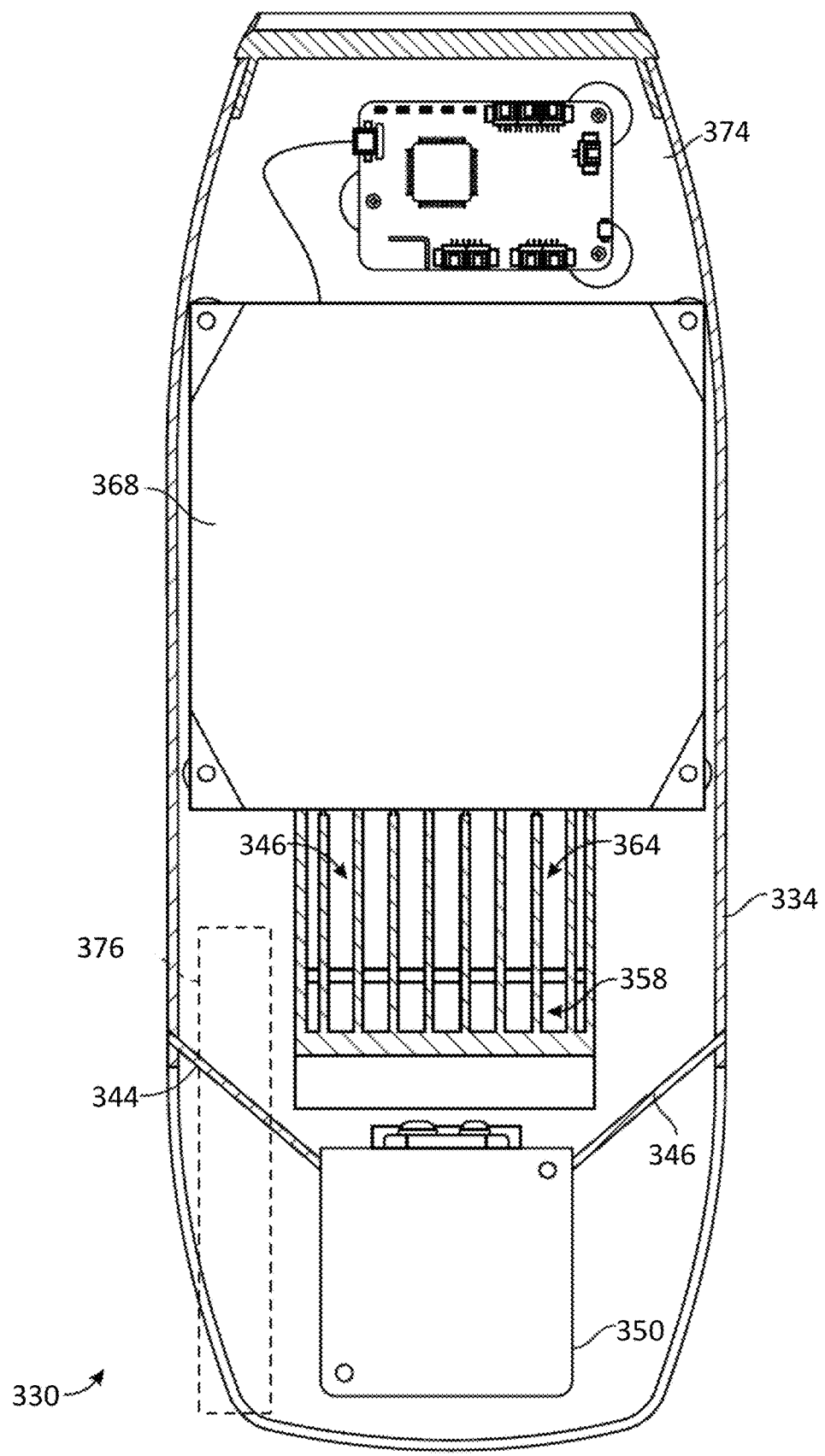
Figure 3I:
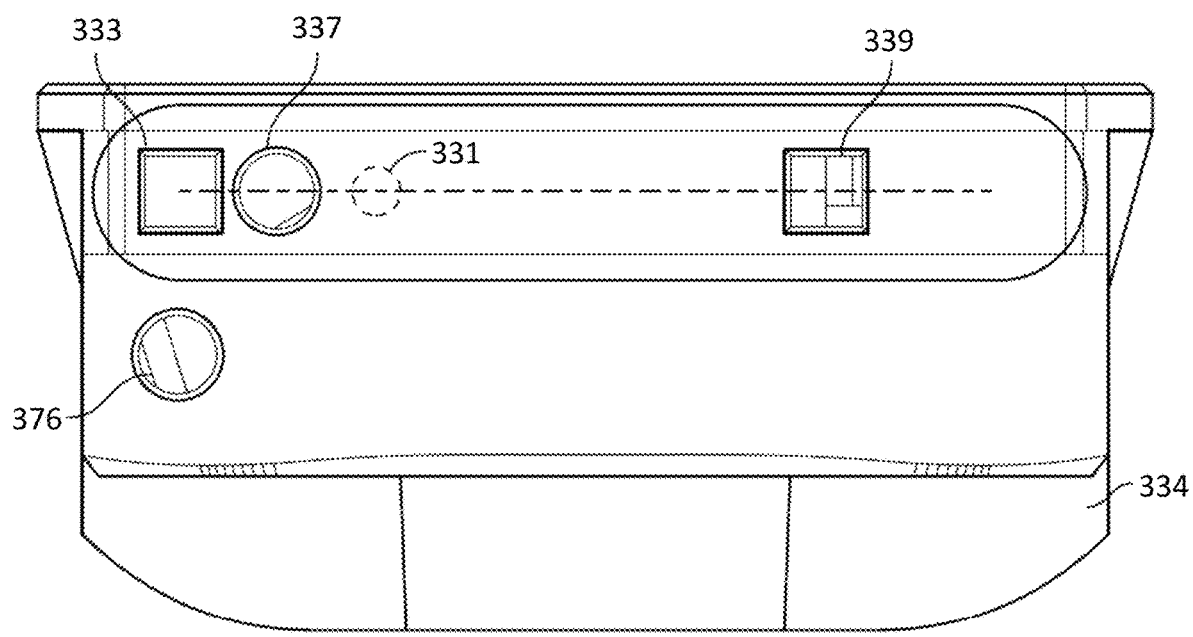
Figure 3J:
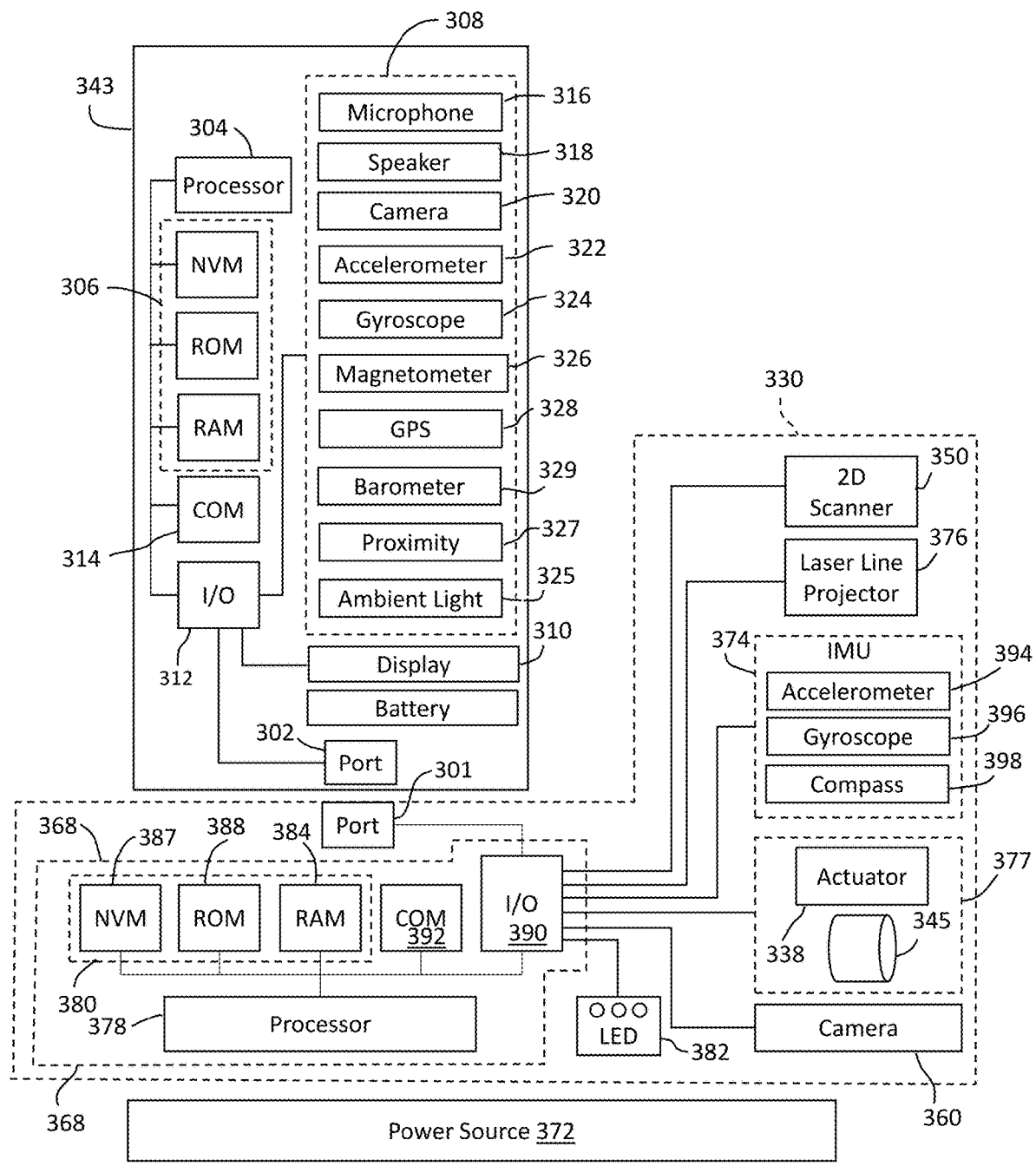
Figure 3K:
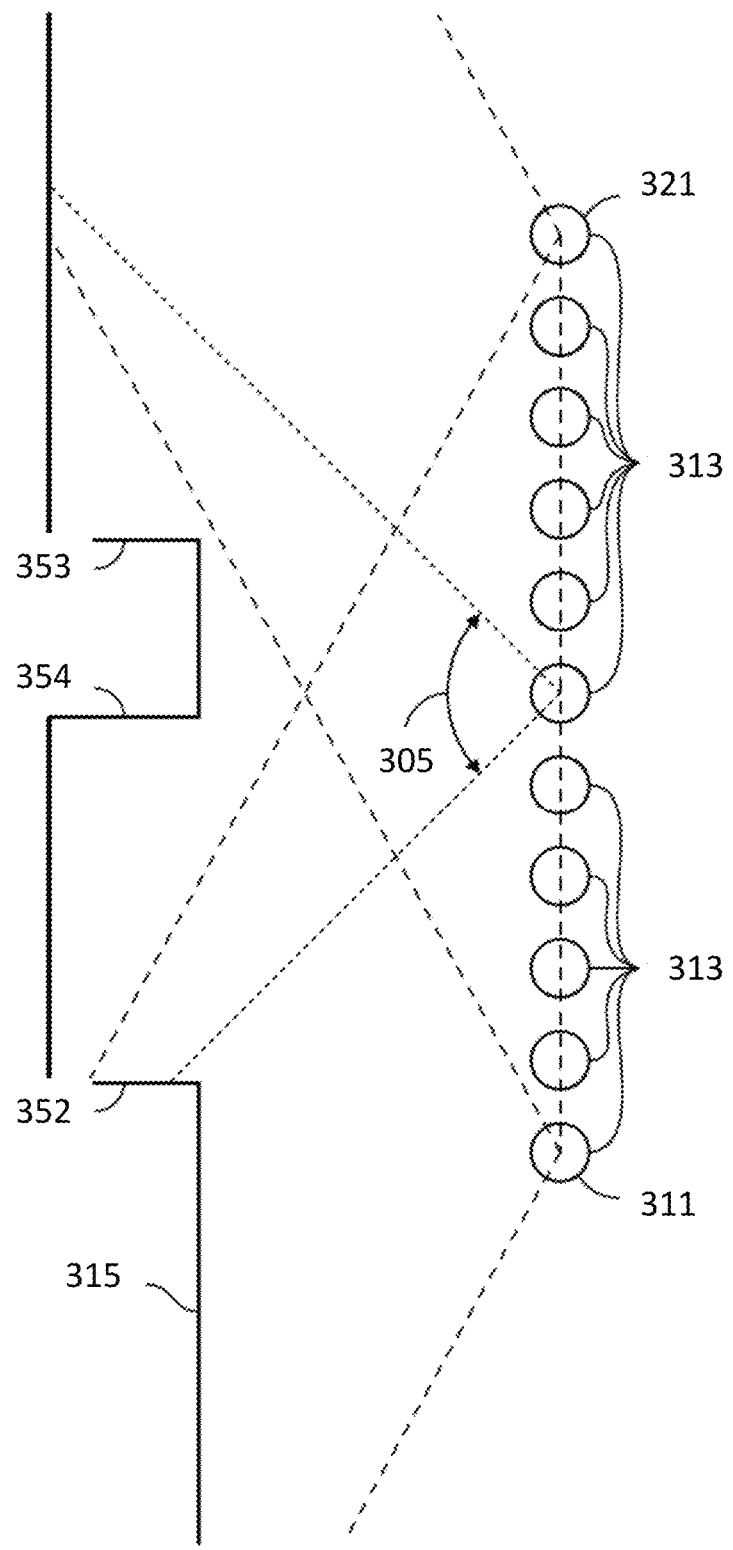
Figure 3L:
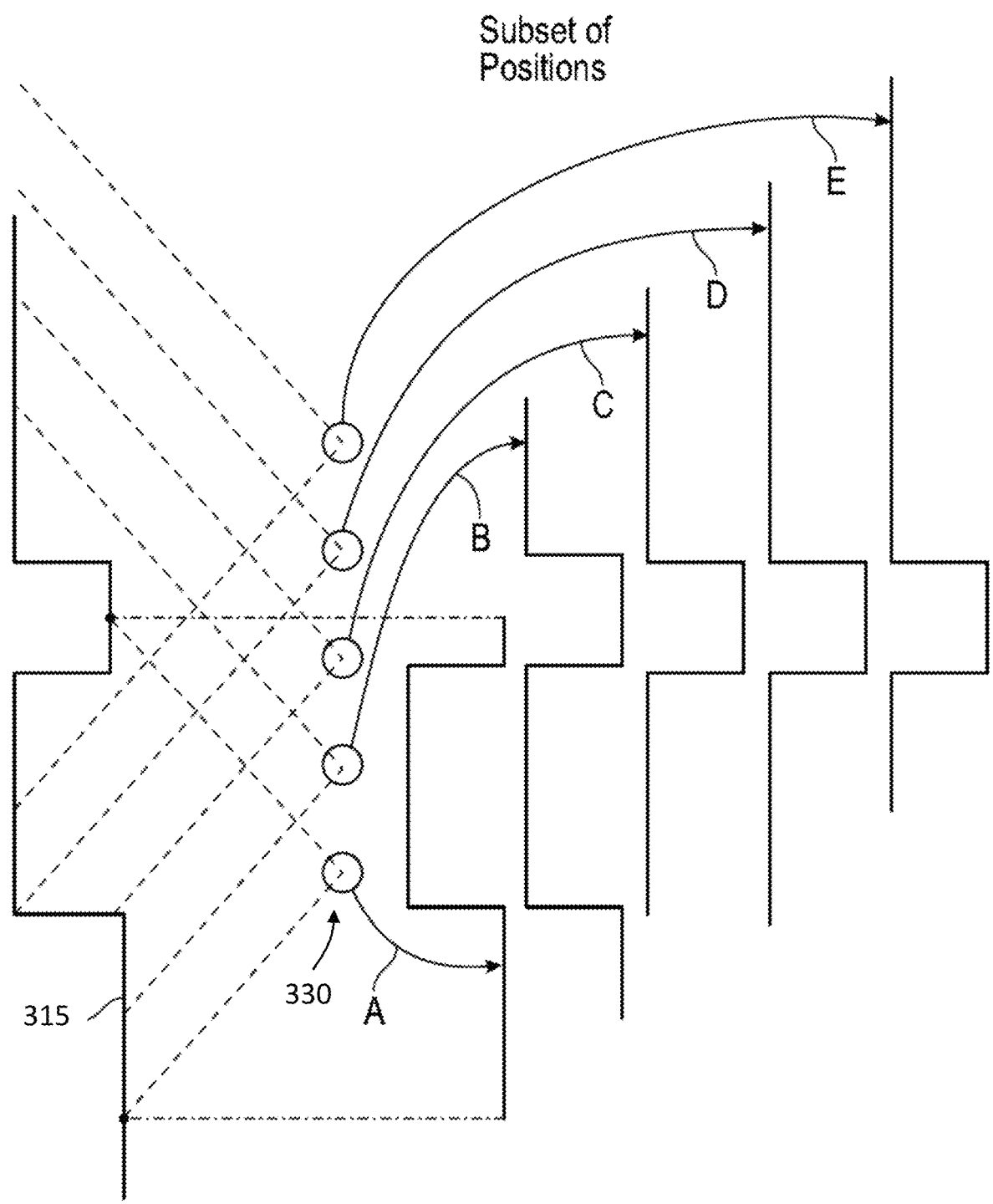
Figure 3O:
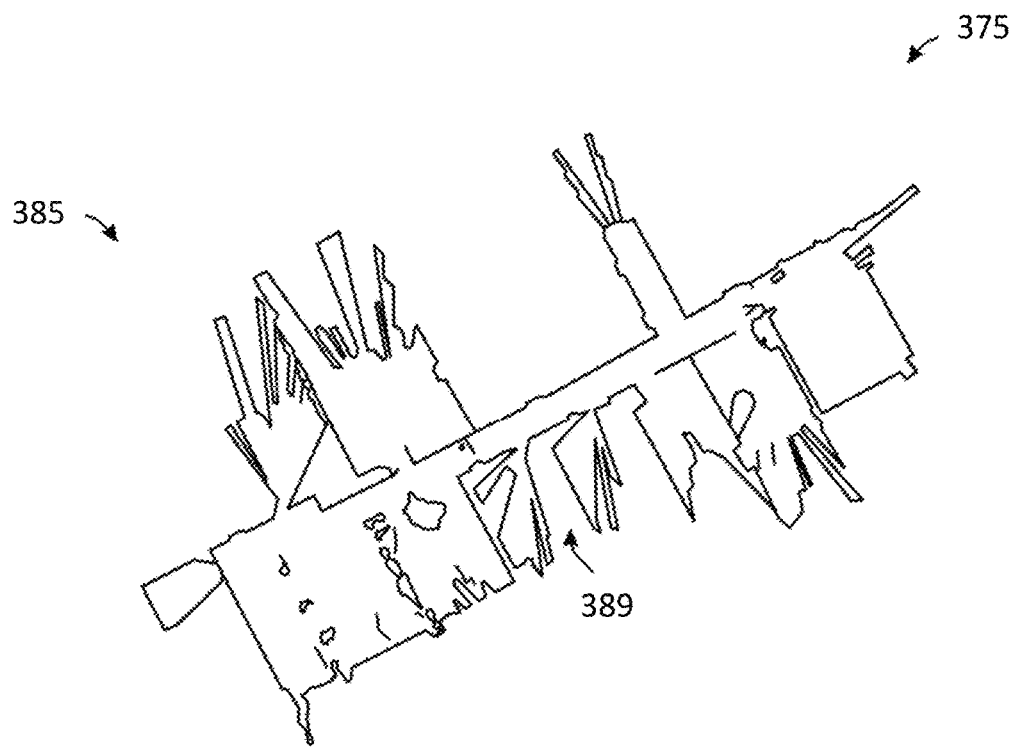
Figure 3P:
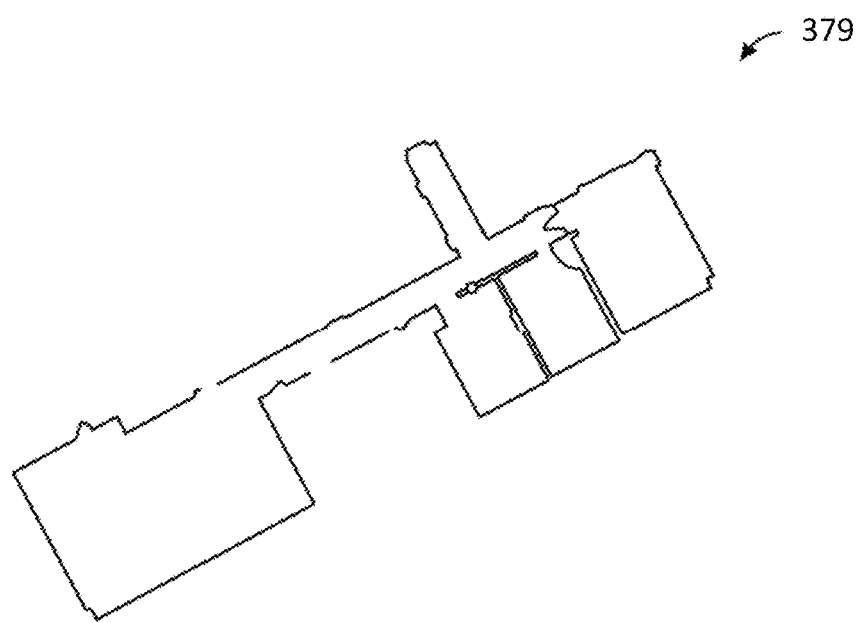
Figure 3Q:
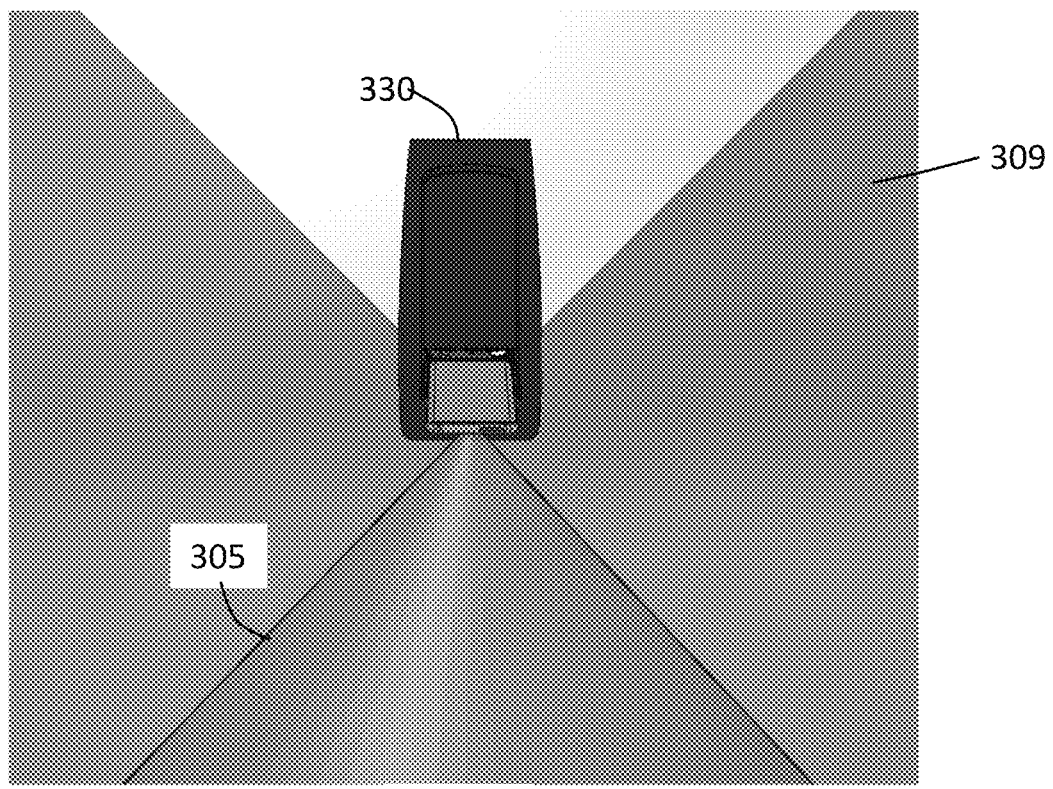
Figure 3R:
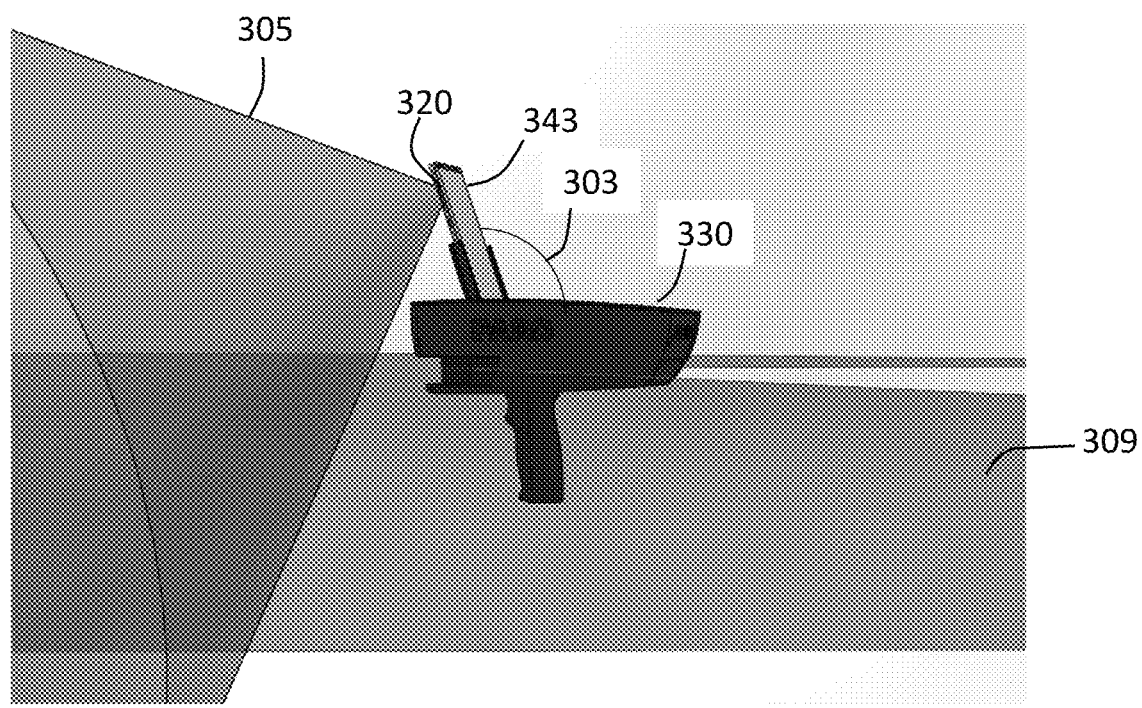

Referring now to FIG. 3A-3R, an embodiment of a 2D scanner 330 is shown having a housing 332 that includes a body portion 334 and a removable handle portion 336. It should be appreciated that while the embodiment of FIGS. 3A-3R illustrate the 2D scanner 330 with the handle 336 attached, the handle 336 may be removed before the 2D scanner 330 is coupled to the base unit when used in the embodiment shown. In an embodiment, the handle 336 may include an actuator 338 that allows the operator to interact with the scanner 330. In the exemplary embodiment, the body 334 includes a generally rectangular center portion 335 with a slot 340 formed in an end 342. The slot 340 is at least partially defined by a pair walls 344 that are angled towards a second end 348. As will be discussed in more detail herein, a portion of a 2D laser scanner 350 is arranged between the walls 344. The walls 344 are angled to allow the 2D laser scanner 350 to operate by emitting a light over a large angular area without interference from the walls 344. As will be discussed in more detail herein, the end 342 may further include a three-dimensional camera or RGBD camera.

Extending from the center portion 335 is a mobile device holder 341. The mobile device holder 341 is configured to securely couple a mobile device 343 to the housing 332. The holder 341 may include one or more fastening elements, such as a magnetic or mechanical latching element for example, that couples the mobile device 343 to the housing 332. In an embodiment, the mobile device 343 is coupled to communicate with a controller 368. The communication between the controller 368 and the mobile device 343 may be via any suitable communications medium, such as wired, wireless or optical communication mediums for example.

In the illustrated embodiment, the holder 341 is pivotally coupled to the housing 332, such that it may be selectively rotated into a closed position within a recess 346. In an embodiment, the recess 346 is sized and shaped to receive the holder 341 with the mobile device 343 disposed therein.

In the exemplary embodiment, the second end 348 includes a plurality of exhaust vent openings 356. In an embodiment, shown in FIGS. 3F-I, the exhaust vent openings 356 are fluidly coupled to intake vent openings 358 arranged on a bottom surface 362 of center portion 335. The intake vent openings 358 allow external air to enter a conduit 364 having an opposite opening 366 in fluid communication with the hollow interior 367 of the body 334. In an embodiment, the opening 366 is arranged adjacent to a controller 368 which has one or more processors that is operable to perform the methods described herein. In an embodiment, the external air flows from the opening 366 over or around the controller 368 and out the exhaust vent openings 356.

In an embodiment, the controller 368 is coupled to a wall 370 of body 334. In an embodiment, the wall 370 is coupled to or integral with the handle 336. The controller 368 is electrically coupled to the 2D laser scanner 350, the 3D camera 360, a power source 372, an inertial measurement unit (IMU) 374, a laser line projector 376 (FIG. 3E), and a haptic feedback device 377.

Referring now to FIG. 3J, elements are shown of the scanner 330 with the mobile device 343 installed or coupled to the housing 332. Controller 368 is a suitable electronic device capable of accepting data and instructions, executing the instructions to process the data, and presenting the results. The controller 368 includes one or more processing elements 378. The processors may be microprocessors, field programmable gate arrays (FPGAs), digital signal processors (DSPs), and generally any device capable of performing computing functions. The one or more processors 378 have access to memory 380 for storing information.

Controller 368 is capable of converting the analog voltage or current level provided by 2D laser scanner 350, camera 360 and IMU 374 into a digital signal to determine a distance from the scanner 330 to an object in the environment. In an embodiment, the camera 360 is a 3D or RGBD type camera. Controller 368 uses the digital signals that act as input to various processes for controlling the scanner 330. The digital signals represent one or more scanner 330 data including but not limited to distance to an object, images of the environment, acceleration, pitch orientation, yaw orientation and roll orientation. As will be discussed in more detail, the digital signals may be from components internal to the housing 332 or from sensors and devices located in the mobile device 343.

In general, when the mobile device 343 is not installed, controller 368 accepts data from 2D laser scanner 350 and IMU 374 and is given certain instructions for the purpose of generating a two-dimensional map of a scanned environment. Controller 368 provides operating signals to the 2D laser scanner 350, the camera 360, laser line projector 376 and haptic feedback device 377. Controller 368 also accepts data from IMU 374, indicating, for example, whether the operator is operating in the system in the desired orientation. The controller 368 compares the operational parameters to predetermined variances (e.g. yaw, pitch or roll thresholds) and if the predetermined variance is exceeded, generates a signal that activates the haptic feedback device 377. The data received by the controller 368 may be displayed on a user interface coupled to controller 368. The user interface may be one or more LEDs (light-emitting diodes) 382, an LCD (liquid-crystal diode) display, a CRT (cathode ray tube) display, or the like. A keypad may also be coupled to the user interface for providing data input to controller 368. In one embodiment, the user interface is arranged or executed on the mobile device 343.

The controller 368 may also be coupled to external computer networks such as a local area network (LAN) and the Internet. A LAN interconnects one or more remote computers, which are configured to communicate with controllers 368 using a well-known computer communications protocol such as TCP/IP (Transmission Control Protocol/Internet(ˆ) Protocol), RS-232, ModBus, and the like. Additional scanners 330 may also be connected to LAN with the controllers 368 in each of these scanners 330 being configured to send and receive data to and from remote computers and other scanners 330. The LAN may be connected to the Internet. This connection allows controller 368 to communicate with one or more remote computers connected to the Internet.

The processors 378 are coupled to memory 380. The memory 380 may include random access memory (RAM) device 384, a non-volatile memory (NVM) device 386, a read-only memory (ROM) device 388. In addition, the processors 378 may be connected to one or more input/output (I/O) controllers 390 and a communications circuit 392. In an embodiment, the communications circuit 392 provides an interface that allows wireless or wired communication with one or more external devices or networks, such as the LAN discussed above or the communications circuit 318.

Controller 368 includes operation control methods embodied in application code. These methods are embodied in computer instructions written to be executed by processors 378, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper-Text Markup Language), Python, Ruby and any combination or derivative of at least one of the foregoing.

Coupled to the controller 368 is the 2D laser scanner 350. The 2D laser scanner 350 measures 2D coordinates in a plane. In the exemplary embodiment, the scanning is performed by steering light within a plane to illuminate object points in the environment. The 2D laser scanner 350 collects the reflected (scattered) light from the object points to determine 2D coordinates of the object points in the 2D plane. In an embodiment, the 2D laser scanner 350 scans a spot of light over an angle while at the same time measuring an angle value and corresponding distance value to each of the illuminated object points.

Examples of 2D laser scanners 350 include but are not limited to Model LMS100 scanners manufactured by Sick, Inc. of Minneapolis, MN and scanner Models URG-04LX-UG01 and UTM-30LX manufactured by Hokuyo Automatic Co., Ltd of Osaka, Japan. The scanners in the Sick LMS100 family measure angles over a 270-degree range and over distances up to 20 meters. The Hoyuko model URG-04LX-UG01 is a low-cost 2D scanner that measures angles over a 240-degree range and distances up to 20 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D laser scanner 350 is oriented so as to scan a beam of light over a range of angles in a generally horizontal plane (relative to the floor of the environment being scanned). At instants in time the 2D laser scanner 350 returns an angle reading and a corresponding distance reading to provide 2D coordinates of object points in the horizontal plane. In completing one scan over the full range of angles, the 2D laser scanner returns a collection of paired angle and distance readings. As the platform is moved from place to place, the 2D laser scanner 350 continues to return 2D coordinate values. These 2D coordinate values are used to locate the position of the scanner 330 thereby enabling the generation of a two-dimensional map or floorplan of the environment.

Also coupled to the controller 386 is the IMU 374. The IMU 374 is a position/orientation sensor that may include accelerometers 394 (inclinometers), gyroscopes 396, a magnetometer or compass 398, and altimeters. In the exemplary embodiment, the IMU 374 includes multiple accelerometers 394 and gyroscopes 396. The compass 398 indicates a heading based on changes in magnetic field direction relative to the earth's magnetic north. The IMU 374 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 374 determines the pose or orientation of the scanner 108 about three-axis to allow a determination of a yaw, roll and pitch parameter.

In the embodiment shown, the scanner 330 further includes a camera 360 that is a 3D or RGB-D camera. As used herein, the term 3D camera refers to a device that produces a two-dimensional image that includes distances to a point in the environment from the location of scanner 330. The 3D camera 360 may be a range camera or a stereo camera. In an embodiment, the 3D camera 360 includes an RGB-D sensor that combines color information with a per-pixel depth information. In an embodiment, the 3D camera 360 may include an infrared laser projector 331, a left infrared camera 333, a right infrared camera 339, and a color camera 337. In an embodiment, the 3D camera 360 is a RealSense™ camera model R200 manufactured by Intel Corporation.

In an embodiment, when the mobile device 343 is coupled to the housing 332, the mobile device 343 becomes an integral part of the scanner 330. In an embodiment, the mobile device 343 is a cellular phone, a tablet computer or a personal digital assistant (PDA). The mobile device 343 may be coupled for communication via a wired connection, such as ports 301, 302. The port 301 is coupled for communication to the processor 378, such as via I/O controller 390 for example. The ports 301, 302 may be any suitable port, such as but not limited to USB, USB-A, USB-B, USB-C, IEEE 1393 (Firewire), or Lightning™ connectors.

The mobile device 343 is a suitable electronic device capable of accepting data and instructions, executing the instructions to process the data, and presenting the results. The mobile device 343 includes one or more processors 304. The processors 304 may be microprocessors, field programmable gate arrays (FPGAs), digital signal processors (DSPs), and generally any device capable of performing computing functions. The one or more processors 304 have access to memory 306 for storing information.

The mobile device 343 is capable of converting the analog voltage or current level provided by sensors 308 and processor 378. Mobile device 343 uses the digital signals that act as input to various processes for controlling the scanner 330. The digital signals represent one or more platform data including but not limited to distance to an object, images of the environment, acceleration, pitch orientation, yaw orientation, roll orientation, global position, ambient light levels, and altitude for example.

In general, mobile device 343 accepts data from sensors 308 and is given certain instructions for the purpose of generating or assisting the processor 378 in the generation of a two-dimensional map or three-dimensional map of a scanned environment. Mobile device 343 provides operating signals to the processor 378, the sensors 308 and a display 310. Mobile device 343 also accepts data from sensors 308, indicating, for example, to track the position of the mobile device 343 in the environment or measure coordinates of points on surfaces in the environment. The mobile device 343 compares the operational parameters to predetermined variances (e.g. yaw, pitch or roll thresholds) and if the predetermined variance is exceeded, may generate a signal. The data received by the mobile device 343 may be displayed on display 310. In an embodiment, the display 310 is a touch screen device that allows the operator to input data or control the operation of the scanner 330.

The controller 368 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(^) Protocol), RS-232, ModBus, and the like. Additional scanners 330 may also be connected to LAN with the controllers 368 in each of these scanners 330 being configured to send and receive data to and from remote computers and other scanners 330. The LAN may be connected to the Internet. This connection allows controller 368 to communicate with one or more remote computers connected to the Internet.

The processors 304 are coupled to memory 306. The memory 306 may include random access memory (RAM) device, a non-volatile memory (NVM) device, and a read-only memory (ROM) device. In addition, the processors 304 may be connected to one or more input/output (I/O) controllers 312 and a communications circuit 314. In an embodiment, the communications circuit 314 provides an interface that allows wireless or wired communication with one or more external devices or networks, such as the LAN or the cellular network discussed above.

Controller 368 includes operation control methods embodied in application code. These methods are embodied in computer instructions written to be executed by processors 378, 304, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 304 are the sensors 308. The sensors 308 may include but are not limited to: a microphone 316; a speaker 318; a front or rear facing camera 320; accelerometers 322 (inclinometers), gyroscopes 324, a magnetometers or compass 326; a global positioning satellite (GPS) module 328; a barometer 329; a proximity sensor 327; and an ambient light sensor 325. By combining readings from a combination of sensors 308 with a fusion algorithm that may include a Kalman filter, relatively accurate position and orientation measurements can be obtained.

It should be appreciated that the sensors 360, 374 integrated into the scanner 330 may have different characteristics than the sensors 308 of mobile device 343. For example, the resolution of the cameras 360, 320 may be different, or the accelerometers 394, 322 may have different dynamic ranges, frequency response, sensitivity (mV/g) or temperature parameters (sensitivity or range). Similarly, the gyroscopes 396, 324 or compass/magnetometer may have different characteristics. It is anticipated that in some embodiments, one or more sensors 308 in the mobile device 343 may be of higher accuracy than the corresponding sensors 374 in the scanner 330. As described in more detail herein, in some embodiments the processor 378 determines the characteristics of each of the sensors 308 and compares them with the corresponding sensors in the scanner 330 when the mobile device. The processor 378 then selects which sensors 374, 308 are used during operation. In some embodiments, the mobile device 343 may have additional sensors (e.g. microphone 316, camera 320) that may be used to enhance operation compared to operation of the scanner 330 without the mobile device 343. In still further embodiments, the scanner 330 does not include the IMU 374 and the processor 378 uses the sensors 308 for tracking the position and orientation/pose of the scanner 330. In still further embodiments, the addition of the mobile device 343 allows the scanner 330 to utilize the camera 320 to perform three-dimensional (3D) measurements either directly (using an RGB-D camera) or using photogrammetry techniques to generate 3D maps. In an embodiment, the processor 378 uses the communications circuit (e.g. a cellular 3G internet connection) to transmit and receive data from remote computers or devices.

In an embodiment, the scanner 330 determines a quality attribute/parameter for the tracking of the scanner 330 and/or the platform. In an embodiment, the tracking quality attribute is a confidence level in the determined tracking positions and orientations to actual positions and orientations. When the confidence level crosses a threshold, the scanner 330 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the scanner 330, or a platform associated with the scanner 330.

In the exemplary embodiment, the scanner 330 is a handheld portable device that is sized and weighted to be carried by a single person during operation. Therefore, the plane 309 in which the 2D laser scanner 350 projects a light beam may not be horizontal relative to the floor or may continuously change as the computer moves during the scanning process. Thus, the signals generated by the accelerometers 394, gyroscopes 396 and compass 398 (or the corresponding sensors 308) may be used to determine the pose (yaw, roll, tilt) of the scanner 108 and determine the orientation of the plane 351.

In an embodiment, it may be desired to maintain the pose of the scanner 330 (and thus the plane 309) within predetermined thresholds relative to the yaw, roll and pitch orientations of the scanner 330. In an embodiment, a haptic feedback device 377 is disposed within the housing 332, such as in the handle 336. The haptic feedback device 377 is a device that creates a force, vibration or motion that is felt or heard by the operator. The haptic feedback device 377 may be but is not limited to: an eccentric rotating mass vibration motor or a linear resonant actuator for example. The haptic feedback device is used to alert the operator that the orientation of the light beam from 2D laser scanner 350 is equal to or beyond a predetermined threshold. In operation, when the IMU 374 measures an angle (yaw, roll, pitch or a combination thereof), the controller 368 transmits a signal to a motor controller 338 that activates a vibration motor 345. Since the vibration originates in the handle 336, the operator will be notified of the deviation in the orientation of the scanner 330. The vibration continues until the scanner 330 is oriented within the predetermined threshold or the operator releases the actuator 338. In an embodiment, it is desired for the plane 309 to be within 10-15 degrees of horizontal (relative to the ground) about the yaw, roll and pitch axes.

In an embodiment, the 2D laser scanner 350 makes measurements as the scanner 330 is moved around in an environment, such from a first position 311 to a second registration position 372. In an embodiment, the scan data is collected and processed as the scanner 330 passes through a plurality of 2D measuring positions 321. At each measuring position 321, the 2D laser scanner 350 collects 2D coordinate data over an effective FOV 305. Using methods described in more detail below, the controller 368 uses 2D scan data from the plurality of 2D scans at positions 321 to determine a position and orientation of the scanner 330 as it is moved about the environment. In an embodiment, a common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D laser scanner 350.

FIG. 3M shows the scanner 330 collecting 2D scan data at selected positions 321 over an effective FOV 305. At different positions 321, the 2D laser scanner 350 captures a portion of the object 315 marked A, B, C, D, and E (FIG. 3L). FIG. 3M shows 2D laser scanner 350 moving in time relative to a fixed frame of reference of the object 315.

FIG. 3M includes the same information as FIG. 3L but shows it from the frame of reference of the scanner 330 rather than the frame of reference of the object 315. FIG. 3M illustrates that in the scanner 330 frame of reference, the position of features on the object change over time. Therefore, the distance traveled by the scanner 330 can be determined from the 2D scan data sent from the 2D laser scanner 350 to the controller 368.

As the 2D laser scanner 350 takes successive 2D readings and performs best-fit calculations, the controller 368 keeps track of the translation and rotation of the 2D laser scanner 350, which is the same as the translation and rotation of the scanner 330. In this way, the controller 368 is able to accurately determine the change in the values of x, y, θ as the scanner 330 moves from the first position 311 to the second position 321.

In an embodiment, the controller 368 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 352, 353, and 354. The mathematical criterion may involve raw processing of the raw data provided by the 2D laser scanner 350 to the controller 368, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 309 of the light beam from 2D laser scanner 350 remains horizontal relative to the ground plane, the first translation value is dx, the second translation value is dy, and the first rotation value dθ. If the first scan data is collected with the 2D laser scanner 350 having translational and rotational coordinates (in a reference coordinate system) of $(x_1, y_1, \theta_1)$, then when the second 2D scan data is collected at a second location the coordinates are given by $(x_2, y_2, \theta_2) = (x_1 + d_x, y_1 + d_y, \theta_1 + d\theta)$. In an embodiment, the controller 368 is further configured to determine a third translation value (for example, $d_z$) and a second and third rotation values (for example, pitch and roll). The third translation value, second rotation value, and third rotation value may be determined based at least in part on readings from the IMU 374.

The 2D laser scanner 350 collects 2D scan data starting at the first position 311 and more 2D scan data at the second position 321. In some cases, these scans may suffice to determine the position and orientation of the scanner 330 at the second position 321 relative to the first position 311. In other cases, the two sets of 2D scan data are not sufficient to enable the controller 368 to accurately determine the first translation value, the second translation value, and the first rotation value. This problem may be avoided by collecting 2D scan data at intermediate scan positions 313. In an embodiment, the 2D scan data is collected and processed at regular intervals, for example, once per second. In this way, features in the environment are identified in successive 2D scans at positions 313. In an embodiment, when more than two 2D scans are obtained, the controller 368 may use the information from all the successive 2D scans in determining the translation and rotation values in moving from the first position 311 to the second position 321. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the scanner 330 is moved beyond the second position 321, a two-dimensional image or map of the environment being scanned may be generated. It should further be appreciated that in addition to generating a 2D map of the environment, the data from scanner 330 may be used to generate (and store) a 2D trajectory of the scanner 330 as it is moved through the environment. In an embodiment, the 2D map and/or the 2D trajectory may be combined or fused with data from other sources in the registration of measured 3D coordinates. It should be appreciated that the 2D trajectory may represent a path followed by the 2D scanner 330.

Referring now to FIG. 3N, a method 307 is shown for generating a two-dimensional map with annotations. The method 307 starts in block 307A where the facility or area is scanned to acquire scan data 375, such as that shown in FIG. 3O. The scanning is performed by carrying the scanner 330 through the area to be scanned. The scanner 330 measures distances from the scanner 330 to an object, such as a wall for example, and also a pose of the scanner 330 in an embodiment the user interacts with the scanner 330 via actuator 338. In the illustrated embodiments, the mobile device 343 provides a user interface that allows the operator to initiate the functions and control methods described herein. Using the registration process desired herein, the two-dimensional locations of the measured points on the scanned objects (e.g. walls, doors, windows, cubicles, file cabinets etc.) may be determined. It is noted that the initial scan data may include artifacts, such as data that extends through a window 385 or an open door 389 for example. Therefore, the scan data 375 may include additional information that is not desired in a 2D map or layout of the scanned area.

The method 307 then proceeds to block 307B where a 2D map 379 is generated of the scanned area as shown in FIG. 3N. The generated 2D map 379 represents a scan of the area, such as in the form of a floor plan without the artifacts of the initial scan data. It should be appreciated that the 2D map 379 represents a dimensionally accurate representation of the scanned area that may be used to determine the position and pose of the mobile scanning platform in the environment to allow the registration of the 3D coordinate points measured by the 3D measurement device. In the embodiment of FIG. 3N, the method 307 then proceeds to block 307C where optional user-defined annotations are made to the 2D maps 379 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). In an embodiment, the annotation may also be used to define scan locations where the mobile scanning platform stops and uses the scanner 330 to perform a stationary scan of the environment.

Once the annotations of the 2D annotated map are completed, the method 307 then proceeds to block 307D where the 2D map is stored in memory, such as nonvolatile memory 387 for example. The 2D map may also be stored in a network accessible storage device or server so that it may be accessed by the desired personnel.

Referring now to FIG. 3Q and FIG. 3R an embodiment is illustrated with the mobile device 343 coupled to the scanner 330. As described herein, the 2D laser scanner 350 emits a beam of light in the plane 309. The 2D laser scanner 350 has a field of view (FOV) that extends over an angle that is less than 360 degrees. In the exemplary embodiment, the FOV of the 2D laser scanner is about 270 degrees. In this embodiment, the mobile device 343 is coupled to the housing 332 adjacent the end where the 2D laser scanner 350 is arranged. The mobile device 343 includes a forward-facing camera 320. The camera 320 is positioned adjacent a top side of the mobile device and has a predetermined field of view 305. In the illustrated embodiment, the holder 341 couples the mobile device 343 on an obtuse angle 303. This arrangement allows the mobile device 343 to acquire images of the floor and the area directly in front of the scanner 330 (e.g. the direction the operator is moving the platform).

In embodiments where the camera 320 is an RGB-D type camera, three-dimensional coordinates of surfaces in the environment may be directly determined in a mobile device coordinate frame of reference. In an embodiment, the holder 341 allows for the mounting of the mobile device 343 in a stable position (e.g. no relative movement) relative to the 2D laser scanner 350. When the mobile device 343 is coupled to the housing 332, the processor 378 performs a calibration of the mobile device 343 allowing for a fusion of the data from sensors 308 with the sensors of scanner 330. As a result, the coordinates of the 2D laser scanner may be transformed into the mobile device coordinate frame of reference or the 3D coordinates acquired by camera 320 may be transformed into the 2D scanner coordinate frame of reference.

In an embodiment, the mobile device is calibrated to the 2D laser scanner 350 by assuming the position of the mobile device based on the geometry and position of the holder 341 relative to 2D laser scanner 350. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 343 in the holder 341. In another embodiment, a calibration is performed each time a different mobile device 343 is used. In this embodiment, the user is guided (such as via the user interface/display 310) to direct the scanner 330 to scan a specific object, such as a door, that can be readily identified in the laser readings of the scanner 330 and in the camera-sensor 320 using an object recognition method.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
a scanner configured to capture a 2D map of an environment;
a camera configured to capture a plurality of panoramic images of the environment from respective locations in the environment;
an inertial measurement unit (IMU) configured to determine a pose of the scanner, and a pose of the camera; and
one or more processors operably coupled to the scanner, the IMU, and the camera, the one or more processors being responsive to executable instructions for converting the 2D map into a 3D mesh, the converting comprising:
generating the 2D map of the environment using data captured by the scanner;
identifying a plurality of features from a subset of the panoramic images captured by the camera;
aligning the subset of the panoramic images with the 2D map using the features that are extracted;
determining 3D coordinates of the features using 2D coordinates from the 2D map and a third coordinate based on a pose of the camera; and
generating a 3D mesh using the 3D coordinates of the features.

2. The system of claim 1, wherein the converting further comprises applying the subset of the panoramic images as textures on the 3D mesh.

3. The system of claim 1, wherein the converting further comprises scaling the 3D mesh using the 2D map.

4. The system of claim 1, wherein the camera is coupled with the scanner at a predetermined offset.

5. The system of claim 1, wherein the camera and the scanner are coupled with a platform at predetermined positions on the platform.

6. The system of claim 1, wherein the features comprise at least one from a corner, an edge, and a predetermined shape.

7. The system of claim 1, wherein the scanner is a 2D scanner disposed in a body of a housing, the housing being sized to be carried by a single person during operation, the body having a first plane extending there through.

8. A method for generating a three-dimensional (3D) mesh of an environment using a two-dimensional (2D) scanner and a camera, the method comprising:
generating a 2D map of the environment using data captured using the 2D scanner;
capturing, using the camera, a plurality of panoramic images of the environment from respective locations in the environment;
identifying a plurality of features from a subset of the panoramic images captured by the camera;
aligning the subset of the panoramic images with the 2D map using the features that are extracted;
determining 3D coordinates of the features using 2D coordinates from the 2D map and a third coordinate based on a pose of the camera; and
generating the 3D mesh using the 3D coordinates of the features.

9. The method of claim 8, further comprising applying the subset of the panoramic images as textures on the 3D mesh.

10. The method of claim 8, wherein the panoramic images are captured at locations different from locations at which the 2D scanner captures data for the 2D map.

11. The method of claim 8, wherein the camera is coupled with the scanner at a predetermined offset.

12. The method of claim 8, wherein the camera and the scanner are coupled with a platform at predetermined positions on the platform.

13. The method of claim 8, wherein the features comprise at least one from a corner, an edge, and a predetermined shape.

14. The method of claim 8, wherein the 2D scanner is disposed in a body of a housing, the housing being sized to be carried by a single person during operation, the body having a first plane extending there through.

15. A computer program product comprising a memory device with computer executable instructions stored thereon, which when executed by one or more processing units causes the one or more processing units to execute a method for generating a three-dimensional (3D) mesh of an environment, the method comprising:
generating a 2D map of the environment using data captured using a 2D scanner;
capturing, using a camera, a plurality of panoramic images of the environment from respective locations in the environment;
identifying a plurality of features from a subset of the panoramic images captured by the camera;
aligning the subset of the panoramic images with the 2D map using the features that are extracted;
determining 3D coordinates of the features using 2D coordinates from the 2D map and a third coordinate based on a pose of the camera; and
generating the 3D mesh using the 3D coordinates of the features.

16. The computer program product of claim 15, wherein the method comprises applying the subset of the panoramic images as textures on the 3D mesh.

17. The computer program product of claim 15, wherein the camera is coupled with the scanner at a predetermined offset.

18. The computer program product of claim 15, wherein the camera and the scanner are coupled with a platform at predetermined positions on the platform.

19. The computer program product of claim 15, wherein the features comprise at least one from a corner, an edge, and a predetermined shape.

20. The computer program product of claim 15, wherein the 2D scanner is disposed in a body of a housing, the housing being sized to be carried by a single person during operation, the body having a first plane extending there through.

* * * * *